(12) United States Patent
Holzer et al.

(10) Patent No.: US 10,855,936 B2
(45) Date of Patent: *Dec. 1, 2020

(54) SKELETON-BASED EFFECTS AND BACKGROUND REPLACEMENT

(71) Applicant: Fyusion, Inc., San Francisco, CA (US)

(72) Inventors: Stefan Johannes Josef Holzer, San Mateo, CA (US); Radu Bogdan Rusu, San Francisco, CA (US); Stephen David Miller, San Francisco, CA (US); Pantelis Kalogiros, San Francisco, CA (US); Matteo Munaro, San Francisco, CA (US); Alexander Jay Bruen Trevor, San Francisco, CA (US); Nico Gregor Sebastian Blodow, Hettenshausen (DE); Luo Yi Tan, San Francisco, CA (US); Mike Penz, Linz (AT); Martin Markus Hubert Wawro, Dortmund (DE); Matthias Reso, San Francisco, CA (US); Chris Beall, San Francisco, CA (US); Yusuke Tomoto, Millbrae, CA (US); Krunal Ketan Chande, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,572

(22) Filed: Sep. 23, 2019

(65) Prior Publication Data

US 2020/0021752 A1    Jan. 16, 2020

Related U.S. Application Data

(63) Continuation of application No. 15/936,141, filed on Mar. 26, 2018, now Pat. No. 10,469,768.

(Continued)

(51) Int. Cl.
*H04N 5/272* (2006.01)
*G06T 7/194* (2017.01)
(Continued)

(52) U.S. Cl.
CPC ......... *H04N 5/272* (2013.01); *G06K 9/00369* (2013.01); *G06K 9/00671* (2013.01);
(Continued)

(58) Field of Classification Search
CPC ... G06T 7/194; G06T 7/11; G06T 7/75; G06T 13/40; G06T 19/006; G06T 2207/10016;
(Continued)

(56) References Cited

U.S. PATENT DOCUMENTS 9,255,813 B2 * 2/2016 Liu ..................... G06T 19/006
10,070,154 B2    9/2018 Holzer et al.
(Continued)

FOREIGN PATENT DOCUMENTS

JP    2015210547 A    11/2015
KR    20160085877 A    7/2016
WO    2019075133 A1    4/2019

OTHER PUBLICATIONS

"U.S. Appl. No. 15/936,131, Non Final Office Action dated Mar. 22, 2019", 12 pgs.
(Continued)

*Primary Examiner* — Maurice L. McDowell, Jr.
*Assistant Examiner* — Donna J. Ricks
(74) *Attorney, Agent, or Firm* — Kwan & Olynick LLP

(57) ABSTRACT

Various embodiments of the present invention relate generally to systems and methods for analyzing and manipulating images and video. In particular, a multi-view interactive digital media representation (MVIDMR) of a person can be generated from live images of a person captured from a hand-held camera. Using the image data from the live (Continued)

images, a skeleton of the person and a boundary between the person and a background can be determined from different viewing angles and across multiple images. Using the skeleton and the boundary data, effects can be added to the person, such as wings. The effects can change from image to image to account for the different viewing angles of the person captured in each image.

20 Claims, 20 Drawing Sheets

Related U.S. Application Data

(60) Provisional application No. 62/572,388, filed on Oct. 13, 2017.

(51) Int. Cl.
| | |
|---|---|
| *G06T 7/11* | (2017.01) |
| *H04N 13/282* | (2018.01) |
| *G06K 9/00* | (2006.01) |
| *G06T 13/40* | (2011.01) |
| *H04N 5/232* | (2006.01) |
| *H04N 5/265* | (2006.01) |
| *H04N 13/111* | (2018.01) |
| *G06T 19/00* | (2011.01) |
| *H04N 13/279* | (2018.01) |

(52) U.S. Cl.
CPC ............... *G06T 7/11* (2017.01); *G06T 7/194* (2017.01); *G06T 13/40* (2013.01); *G06T 19/006* (2013.01); *H04N 5/23216* (2013.01); *H04N 5/265* (2013.01); *H04N 13/111* (2018.05); *H04N 13/282* (2018.05); *G06T 2207/10016* (2013.01); *G06T 2207/30196* (2013.01); *H04N 13/279* (2018.05); *H04N 2005/2726* (2013.01)

(58) Field of Classification Search
CPC . G06T 2207/30196; G06T 2207/10024; G06T 2207/20084; G06T 2207/10028; H04N 5/272; H04N 13/282; H04N 5/23216; H04N 5/265; H04N 13/111; H04N 13/279; H04N 5/247; H04N 2005/2726; G06K 9/00369; G06K 9/00671; G06K 9/44; G06K 9/469; G01S 3/00

See application file for complete search history.

(56) References Cited

U.S. PATENT DOCUMENTS

| | | | |
|---|---|---|---|
| 10,089,793 B2* | 10/2018 | Holmes | G06F 3/048 |
| 10,356,341 B2 | 7/2019 | Holzer et al. | |
| 10,452,128 B2* | 10/2019 | Ishihara | G02B 27/0176 |
| 10,469,768 B2* | 11/2019 | Holzer | G06K 9/44 |
| 2009/0252423 A1* | 10/2009 | Zhu | G06K 9/00201 |
| | | | 382/209 |
| 2011/0306420 A1 | 12/2011 | Nishimoto et al. | |
| 2013/0018881 A1 | 1/2013 | Bhatt | |
| 2013/0314442 A1* | 11/2013 | Langlotz | G06T 19/006 |
| | | | 345/633 |
| 2014/0024971 A1* | 1/2014 | Bunn | A61B 5/11 |
| | | | 600/595 |
| 2015/0002745 A1* | 1/2015 | Bernal | G06T 5/001 |
| | | | 348/575 |
| 2015/0130799 A1* | 5/2015 | Holzer | G06F 16/532 |
| | | | 345/420 |
| 2017/0011247 A1* | 1/2017 | Kuji | G06K 19/06037 |
| 2017/0277363 A1 | 9/2017 | Holzer et al. | |
| 2018/0220048 A1* | 8/2018 | Tamir | H04N 13/257 |
| 2018/0225517 A1 | 8/2018 | Holzer et al. | |
| 2018/0227482 A1 | 8/2018 | Holzer et al. | |
| 2018/0227601 A1 | 8/2018 | Holzer et al. | |
| 2019/0114836 A1 | 4/2019 | Holzer et al. | |
| 2019/0116322 A1 | 4/2019 | Holzer et al. | |

OTHER PUBLICATIONS

"U.S. Appl. No. 15/936,131, Non Final Office Action dated Mar. 22, 2019", 7 Pages.

"U.S. Appl. No. 15/936,131, Notice of Allowance dated May 1, 2019", 6 Pages.

"U.S. Appl. No. 15/936,141, Examiner Interview Summary dated Jun. 25, 2019", 1 page.

"U.S. Appl. No. 15/936,141, Notice of Allowance dated Jun. 25, 2019", 10 pages.

"Int'l Application Serial No. PCT/US18/55307, Int'l Search Report and Written Opinion dated Feb. 1, 2019", 10 pgs.

\* cited by examiner

SKELETON-BASED EFFECTS AND BACKGROUND REPLACEMENT

CROSS-REFERENCE TO RELATED APPLICATIONS

This application is a continuation of and claims priority to U.S. patent application Ser. No. 15/936,141, titled, "SKELETON-BASED EFFECTS AND BACKGROUND REPLACEMENT," by Holzer, et al., filed Mar. 26, 2018, which claims priority to U.S. Provisional Patent Application No. 62/572,388, titled "SKELETON-BASED EFFECTS AND BACKGROUND REPLACEMENT," by Holzer, et al., filed Oct. 13, 2017. This application is also related to U.S. patent application Ser. No. 15/936,131 filed on Mar. 26, 2018 and titled, "Skeleton-Based Effects and Background Replacement," by Holzer et al. U.S. patent application Ser. No. 15/936,141, U.S. patent application Ser. No. 15/936,131, and U.S. Provisional Patent Application No. 62/572,388 are hereby incorporated by reference herein in their entirety and for all purposes.

TECHNICAL FIELD

The present disclosure relates to the detection and tracking of skeletons and background replacement, and in particular to the detection and tracking of skeletons and background replacement in live video streams.

Skeleton identification is a key component in many video processing tasks. For instance, to determine if a person is exhibiting a particular static pose or moving in a particular fashion, the person may be abstracted into a skeleton having a body, head, and limbs. However, skeleton detection is challenging because people can assume very different poses that can result in very different appearance in the image. Also, self-occlusions or occlusions with other people or objects can hide some joints.

Skeleton detection may also be used in visual filtering. Images captured by cameras are commonly modified by applying visual filters. For example, a visual filter may sharpen, blur, or emboss an image to introduce a desired visual effect. Applying a filter to an image can in some cases require a considerable amount of computing resources. However, because an image is static, mobile computing devices such as mobile phones are often capable of performing static image filtering. Filters can also be applied to moving images. For instance, video footage can be sharpened, blurred, or embossed in the same way as a static image. However, filtering video footage typically requires substantial computing resources. Although a mobile computing device may be able to perform simple video filtering, applying complex filtering operations based on skeleton detection to live video streams is well beyond the computing capabilities of mobile computing devices.

Accordingly, it is desirable to develop improved mechanisms and processes relating to skeleton detection and tracking in video streams on mobile devices. Such improved mechanisms and processes can facilitate the application of filters to either live video streams or pre-recorded video streams. In addition, such improved mechanisms and filters would allow the recognition of poses and gestures in live video streams or pre-recorded video streams.

Overview

Various embodiments of the present invention relate generally to systems and methods for analyzing and manipulating images and video. According to particular embodiments, the spatial relationship between multiple images and video is analyzed together with location information data, for purposes of creating a representation referred to herein as a multi-view interactive digital media representation (MVIDMR). The MVIDMR can be output to a device with a display, such as a mobile device, tablet computer or laptop computer.

MVIDMRs can include images of an object from many different viewing angles. Images with viewing angles about a common axis can be grouped together. These images can be provided in a sequence where the viewing angle changes from image to image in the sequence in an orderly manner. Thus, as the sequence of images is viewed on a display, the object can appear to rotate about the common axis. In particular embodiments, a multi-view interactive digital media representation can be provided with images with viewing angles about one or more axes. Thus, when viewed the object in the MVIDMR can appear to rotate about the one or more axes.

In one embodiment, a method can be generated on a mobile device including a processor, a memory, a camera, a plurality of sensors, a microphone and a touchscreen display. The method can be generally characterized as, 1) receiving via an input interface on the mobile device a request to generate a multi-view interactive digital media representation of an object, such as a person; 2) receiving live images from the camera on the mobile device as the mobile device moves along a trajectory wherein an orientation of the camera varies along the trajectory such that the object in the live images is captured from a plurality of camera views; 3) receiving a selection of an effect which modifies the object in the multi-view interactive digital media representation of the object; 4) for one or more images in the live images, generating an initial skeleton indicating a location of body parts of the object in the one or more images; 5) for the one or more images in the live images, generating an initial segmentation which includes a boundary between the object and a background; 6) for the one or more images in the live images, based upon the initial skeleton and the initial segmentation, generating a preview of the effect where the preview includes one or more augmented frames with the effect modifying the object; and 7) while live images are being selected and recorded for the multi-view interactive digital media representation, outputting the preview of the effect to the touchscreen display.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
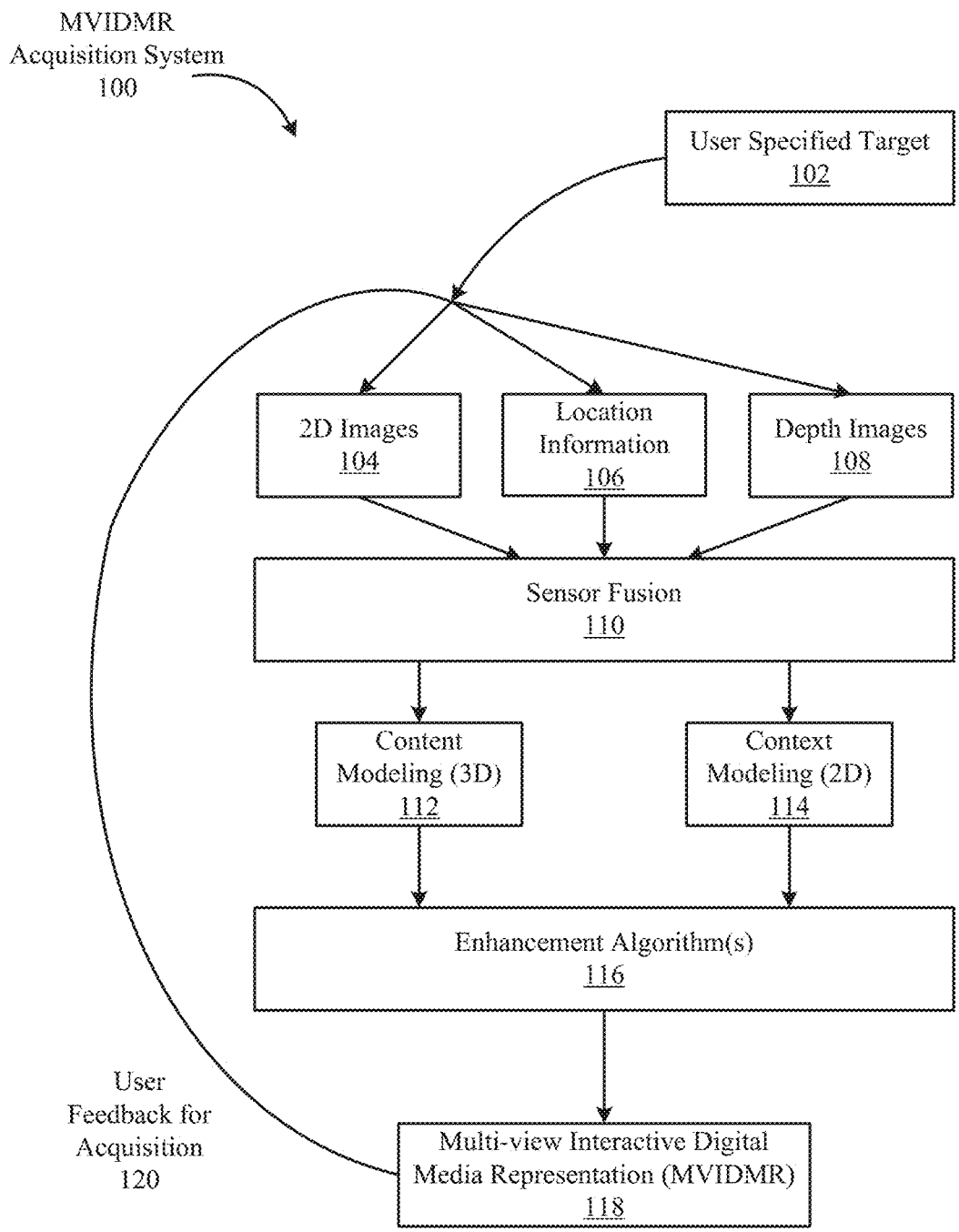
FIG. 1 illustrates an example of a multi-view interactive digital media representation acquisition system in accordance with embodiments of the present invention.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation (MVIDMR), which eliminates redundancy in the data, and presents a user with an interactive and immersive active viewing experience. According to various embodiments, active is described in the context of providing a user with the ability to control the viewpoint of the visual information displayed on a screen.

Next, with respect to FIGS. 1-18 methods and apparatus for acquiring image data and generating a multi-view interactive digital media representation (MVIDMR) are discussed. In particular embodiments, the MVIDMRs can be generated from a video stream of a person captured using a mobile device. The video stream can include a plurality of frames each having image data. Skeleton detection can be applied to the frames to determine a skeleton of the person and identify a pose. Segmentation can be applied to the frames to separate the person from the background of the frames. The methodology can be applied to other types of objects and an example of a person is provided for the purposes of illustration only.

Based upon the skeleton detection and segmentation, the frames and subsequent MVIDMR can be augmented with effects that extend into the background surrounding the person. An effect can include a structure that appears to be anchored to extend from the person. For example, an effect, such as wings, can be generated, which are anchored to the skeleton of the person in the MVIDMR. In addition, the effect, such as, the wings can extend into the background surrounding the person as determined via the segmentation. Further, the background, as determined via the segmentation can be replaced with an alternate context. The MVIDMR can be configured to allow the person, the effects and the background to be viewed from alternate view points, such as views about an axis of rotation.

The example of a person is provided for the purposes of illustration only. Other types of objects can be the subject of an MVIDMR using the methods described herein. For example, a car can be detected in a video stream and background segmentation can be used to draw effects around the car, such as flames. Then, an MVIDMR can be generated with a car including flames extending from the car which extend into the background surrounding the car where the MVIDMR allows the car and the flames to be viewed from different viewing angles.

In the case of an object, such as a car, skeleton detection can refer to identifying important locations/structures on the car. For example, the car skeleton can include the car frame and associated parts, such as wheels, windows, door handles. The skeleton detection can identify locations which define these parts and allow them to be identified. For different objects, different skeletons can be defined and then be detected.

A number of sections are described in the detailed description. In a first section, including FIGS. 1 to 6D and entitled "MVIDMR Generation," some aspects of image capture and MVIDMR generation are discussed. In more detail, an example of MVIDMR system is discussed with respect to FIG. 1. An example of a process flow for generating an MVIDMR is described. With respect to FIG. 3, one example of multiple camera views that can be fused into a three-dimensional (3D) model to create an immersive experience is discussed. With respect to FIG. 4, one example of separating content and context for MVIDMR generation is described. Examples of concave view and convex views, respectively, where both views use a back-camera capture style are described with respect to FIGS. 5A and 5B. Various capture modes, which can be used in MVIDMR generation, are discussed with respect to FIGS. 6A to 6D.

Figure 7:
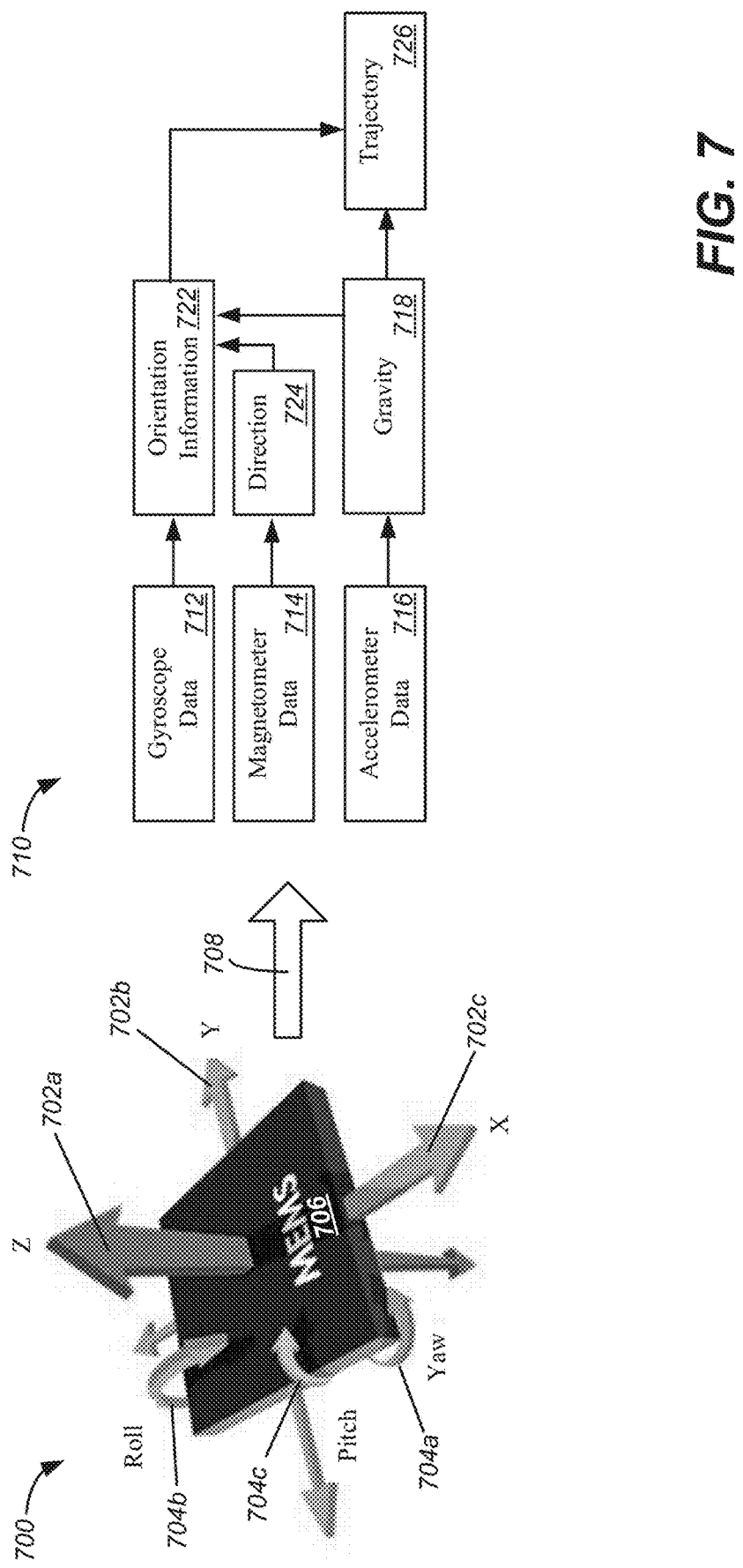
FIG. 7 illustrates a sensor package for determining orientation of a camera used to generate a MVIDMR in accordance with embodiments of the present invention.
Figure 8B:
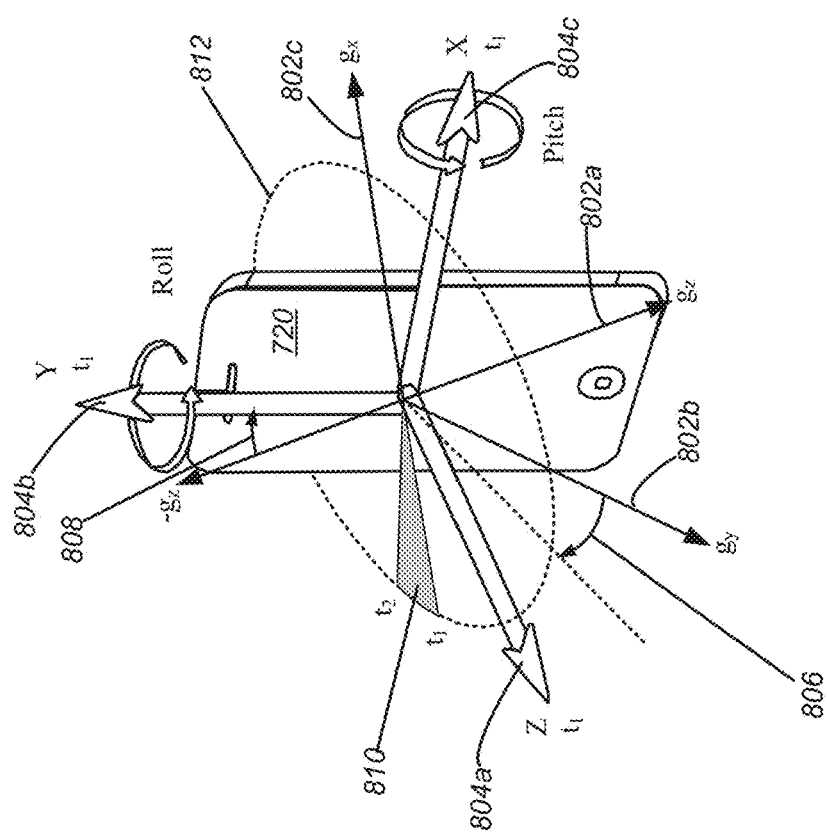
FIG. 8B illustrates pitch and roll of a mobile device and angle changes as a function of time relative to the gravity vector during MVIDMR generation in accordance with embodiments of the present invention.
Figure 8A:
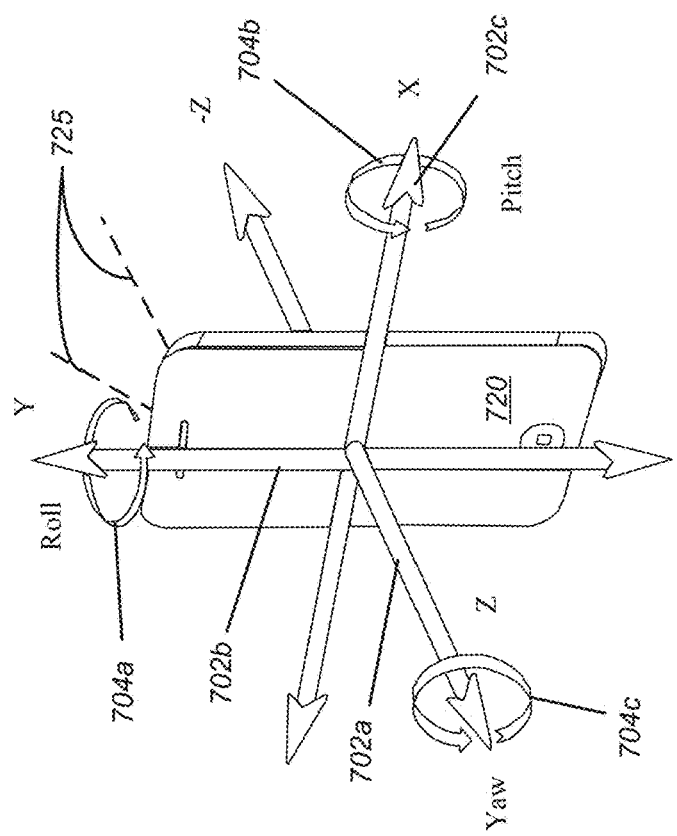
FIG. 8A illustrates a mobile device and body-centric coordinate system in accordance with embodiments of the present invention.

In a second section, including FIGS. 7, 8A and 8B, and entitled "IMU Data and Processing," sensor packages are described. In particular, with respect to FIG. 7, some examples of sensor packages, their integration into a mobile device and sensors are discussed. The sensor data from the sensor packages can be used in the MVIDMR generation process. With respect to FIGS. 8A to 8B, rotation metrics and angle measurements determined from IMU data are described. The rotation data and angle measurements can be used to determine a ground plane of the camera and a viewing angle of the object which is captured in the images.

In a third section, including FIGS. 9A, 9B, 10 and 11, entitled, "Skeleton Detection and Body Segmentation," methods of i) detecting a person in an image, ii) determining an outline of the person, segmenting the image of the person from the background and iii) determining a skeleton of the person and position/pose of the skeleton, are described. Based upon this information, image effects, such as replacing a portion of the person's skeleton, can be performed with the image data.

In a fourth section, including FIGS. 12, 13, 14A, 14B, 15, 16, 17 and 18, entitled, "Body Segmentation and Background Effects," methods of adding effects to a person or other object for use in an MVIDMR are described. First, with respect to FIGS. 12, 13, 14B and 15, a preview stage is described. In the preview stage, live video stream of a person is captured. Frames from the live video stream can be augmented with an effect that is to be added to the person in the MVIDMR. For example, wings can be added to the person. In the preview stage, the effect on the person, such as the effect of adding a structure like wings can be previewed as the live video stream is captured.

After the preview stage, as is described with respect to FIGS. 14A, 14B, 16 and 17, additional processing can be performed to generate an MVIDMR which includes the previewed effect. In one embodiment, as described with respect to FIG. 14A, the MVIDMR can be configured to show a transformation where a selected effect is gradually added to a frame. The processing steps needed to generate the MVIDMR are described with respect to FIGS. 16 and 17. Finally, systems which can be used to perform the initial processing and additional processing are described with respect to FIG. 18.

MVIDMR Generation

With reference to FIG. 1, shown is one example of a multi-view interactive digital media representation acquisition system 100. In the present example embodiment, the multi-view interactive digital media representation acquisition system 100 is depicted in a flow sequence that can be used to generate a multi-view interactive digital media representation. According to various embodiments, the data used to generate a multi-view interactive digital media representation can come from a variety of sources.

In particular, data such as, but not limited to two-dimensional (2D) images 104 can be used to generate a multi-view interactive digital media representation. Images can also be referred to as frames, video frames or image frames. These 2D images can include color image data streams such as multiple image sequences, video data, etc., or multiple images in any of various formats for images, depending on the application. Another source of data that can be used to generate a multi-view interactive digital media representation includes environment information 106. This environment information 106 can be obtained from sources such as accelerometers, gyroscopes, magnetometers, GPS, WiFi, IMU-like systems (Inertial Measurement Unit systems), and the like. Some methods of utilizing the IMU to generate a multi-view interactive digital media representation are described in more detail below with respect to FIGS. 7, 8A and 8B. Yet another source of data that can be used to generate a multi-view interactive digital media representation can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a multi-view interactive digital media representation can be generated for a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a multi-view interactive digital media representation are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a multi-view interactive digital media representation can be generated without a user specified target in some applications.

In the present example embodiment, one or more enhancement algorithms can be applied at enhancement algorithm(s) block 116. In particular example embodiments, various algorithms can be employed during capture of multi-view interactive digital media representation data, regardless of the type of capture mode employed. These algorithms can be used to enhance the user experience. For instance, automatic frame selection, stabilization, view interpolation, filters, and/or compression can be used during capture of multi-view interactive digital media representation data. In some examples, these enhancement algorithms can be applied to image data after acquisition of the data. In other examples, these enhancement algorithms can be applied to image data during capture of multi-view interactive digital media representation data.

According to particular example embodiments, automatic frame selection can be used to create a more enjoyable multi-view interactive digital media representation. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a multi-view interactive digital media representation in a manner similar to that used for video. In particular, key frames in a multi-view interactive digital media representation can be stabilized for to produce improvements such as smoother transitions, improved/enhanced focus on the content, etc. However, unlike video, there are many additional sources of stabilization for a multi-view interactive digital media representation, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a multi-view interactive digital media representation. Because points of interest in a multi-view interactive digital media representation are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for multi-view interactive digital media representations. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a multi-view interactive digital media representation is often focused on a particular object of interest, a multi-view interactive digital media representation can be content-weighted so that the object of interest is maximally stabilized in some examples.

Another way to improve stabilization in a multi-view interactive digital media representation includes direct selection of a region of a screen. For instance, if a user taps to focus on a region of a screen, then records a convex multi-view interactive digital media representation, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic key points. In another example, a user can select an area of image to use as a source for key points.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a multi-view interactive digital media representation in some embodiments. In other embodiments, view interpolation can be applied during multi-view interactive digital media representation generation.

In some examples, filters can also be used during capture or generation of a multi-view interactive digital media representation to enhance the viewing experience. Just as many popular photo sharing services provide aesthetic filters that can be applied to static, two-dimensional images, aesthetic filters can similarly be applied to surround images. However, because a multi-view interactive digital media representation is more expressive than a two-dimensional image, and three-dimensional information is available in a multi-view interactive digital media representation, these filters can be extended to include effects that are ill-defined in two dimensional photos. For instance, in a multi-view interactive digital media representation, motion blur can be added to the background (i.e. context) while the content remains crisp. In another example, a drop-shadow can be added to the object of interest in a multi-view interactive digital media representation.

In various examples, compression can also be used as an enhancement algorithm 116. In particular, compression can be used to enhance user-experience by reducing data upload and download costs. Because multi-view interactive digital media representations use spatial information, far less data can be sent for a multi-view interactive digital media representation than a typical video, while maintaining desired qualities of the multi-view interactive digital media representation. Specifically, the IMU, keypoint tracks, and user input, combined with the view interpolation described above, can all reduce the amount of data that must be transferred to and from a device during upload or download of a multi-view interactive digital media representation. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a multi-view interactive digital media representation 118 is generated after any enhancement algorithms are applied. The multi-view interactive digital media representation can provide a multi-view interactive digital media representation. In various examples, the multi-view interactive digital media representation can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, multi-view interactive digital media representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with multi-view interactive digital media representations that allow the multi-view interactive digital media representations to be indexed with a high degree of efficiency and accuracy; and the ability of the user to interact and change the viewpoint of the multi-view interactive digital media representation. In particular example embodiments, the characteristics described above can be incorporated natively in the multi-view interactive digital media representation, and provide the capability for use in various applications. For instance, multi-view interactive digital media representations can be used to enhance various fields such as e-commerce, visual search, 3D printing, file sharing, user interaction, and entertainment.

In some embodiments, a multi-view interactive digital media representation can use a series of 2-D images of a physical object taken from multiple viewpoints. When the 2-D images are output to a display, the physical object can appear to undergo a 3-D transformation, such as a rotation in 3-D space. This embodiment of the multi-view interactive digital media representation approach differs from using a full 3-D model of the physical object.

With a full 3-D model approach, the physical object can be represented as a series of polygons where the polygons are defined by points in a 3-D model space. After the 3-D model of the physical object is generated, the 3-D model can be initially positioned in the 3-D model space. Then, the position of the 3-D model can be adjusted in 3-D model space as function of time. For example, the 3-D model of the physical object can be rotated in the 3-D model space.

The re-positioning of the 3-D model involves determining a new location of each of the points of the 3-D model in the 3-D model space. Next, textures can be reapplied to the 3-D model. Yet further, a background can be added to the 3-D model space. Then, a light source in the 3-D model space can be simulated. Finally, based upon the light source, the 3-D model and the background can be re-rendered to a 2-D image. This process is repeated each time the 3-D model is changed in the 3-D model space.

The determination of the changes to the 3-D model positions in the 3-D space as a function of time, the re-texturing of the model, the addition of the background and then the re-rendering is computationally expensive, especially as the complexity of the 3-D model increases. Further, as described above, it requires the generation and storage of a 3-D model and its defining parameters, which is time consuming. Thus, the multi-view interactive digital media representation can be more computationally efficient and require less memory resources than a 3-D model approach.

In addition, when an apparent motion of an object is output from a multi-view interactive digital media representation, it appears as if the object motion is generated from an image quality 3-D textured model. Image quality 3-D textured models are generated in a time consuming and often manual process. In particular, the generation of an image quality textured 3-D model of an object, such as an actual person's face, is notoriously difficult and time consuming, especially, when a "life like" rendering of the object is desired.

In this embodiment of the multi-view interactive digital media representation approach, because of the elimination of the 3-D modeling steps, user-selected objects from user generated 2-D images can be converted quickly to a multi-view interactive digital media representation and then output to a display in real-time. During output, the user can control aspects of apparent motion of the object within the multi-view interactive digital media representation. Because the object in the multi-view interactive digital media representation can be generated from real images, such as images received from a user-controlled camera, the object appears life-like when output. In a traditional 3-D modeling approach, because of the difficulties associated with generating an image quality 3-D model, this capability is not offered.

Returning to FIG. 1, according to various example embodiments, once a multi-view interactive digital media representation 118 is generated, user feedback for acquisition 120 of additional image data can be provided. In particular, if a multi-view interactive digital media representation is determined to need additional views to provide a more accurate model of the content or context, a user may be prompted to provide additional views. Once these additional views are received by the multi-view interactive digital media representation acquisition system 100, these additional views can be processed by the system 100 and incorporated into the multi-view interactive digital media representation.

Figure 2:
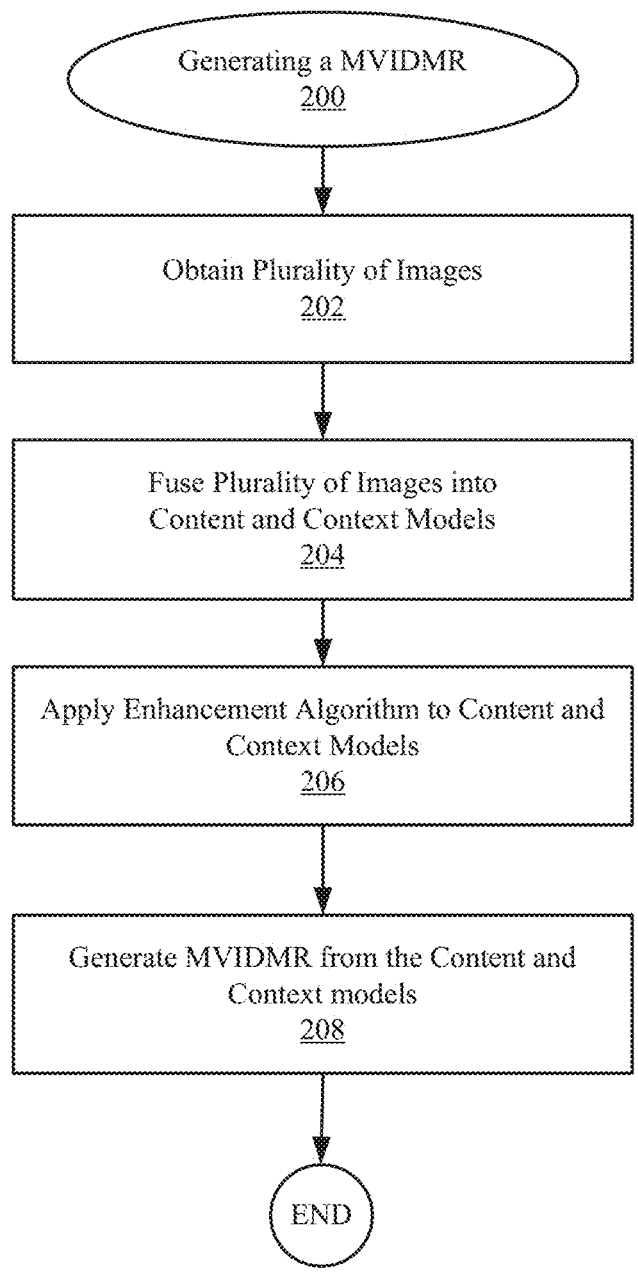
FIG. 2 illustrates an example of a process flow for generating a multi-view interactive digital media representation in accordance with embodiments of the present invention.

With reference to FIG. 2, shown is an example of a process flow diagram for generating a multi-view interactive digital media representation 200. In the present example, a plurality of images is obtained at 202. According to various embodiments, the plurality of images can include two-dimensional (2D) images or data streams. These 2D images can include location information that can be used to generate a multi-view interactive digital media representation. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a multi-view interactive digital media representation is generated from the content and context models at 208. The multi-view interactive digital media representation can provide a multi-view interactive digital media representation. In various examples, the multi-view interactive digital media representation can include a three-dimensional model of the content and a two-dimensional model of the context. According to various embodiments, depending on the mode of capture and the viewpoints of the images, the multi-view interactive digital media representation model can include certain characteristics. For instance, some examples of different styles of multi-view interactive digital media representations include a locally concave multi-view interactive digital media representation, a locally convex multi-view interactive digital media representation, and a locally flat multi-view interactive digital media representation. However, it should be noted that multi-view interactive digital media representations can include combinations of views and characteristics, depending on the application.

Figure 3:
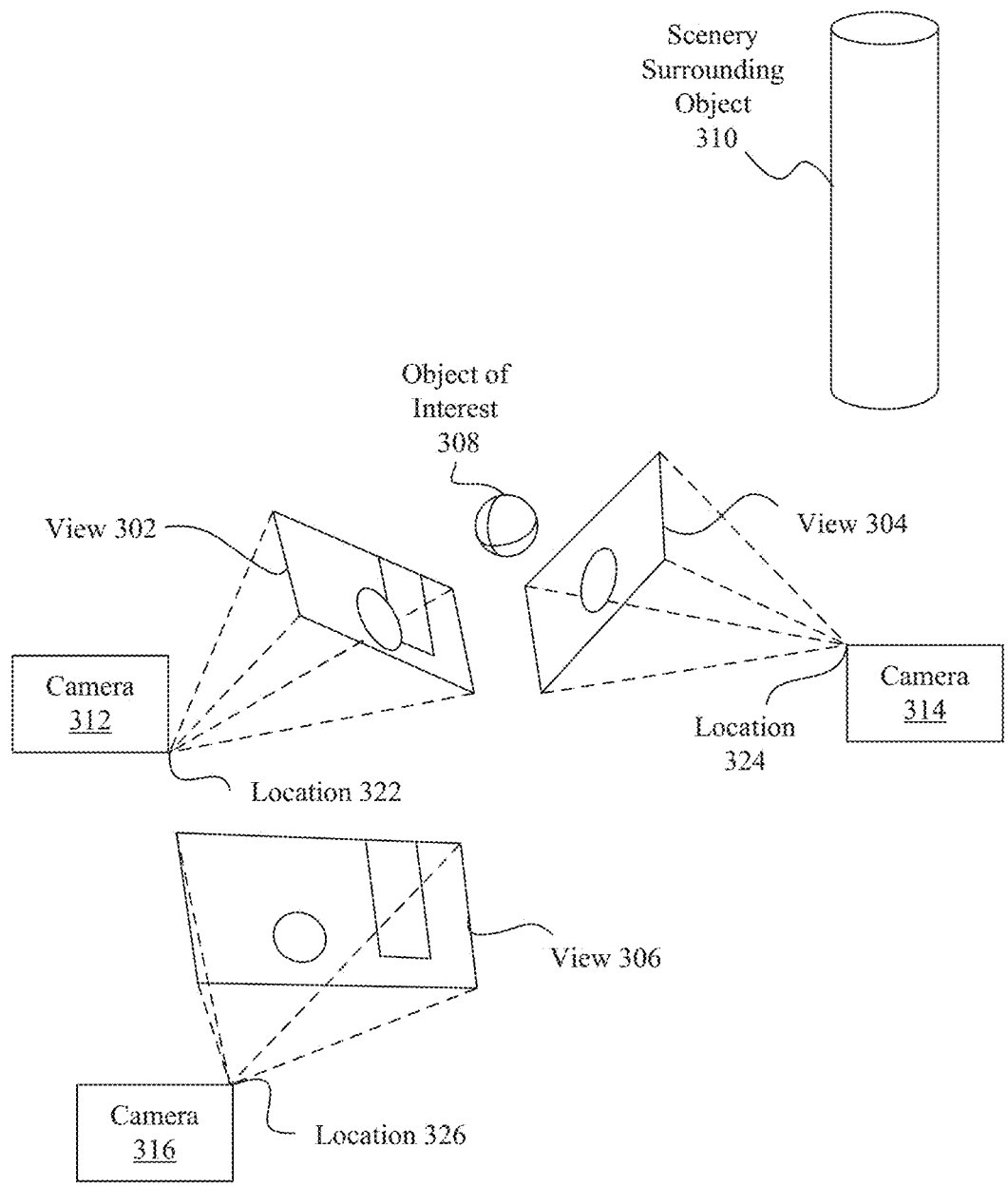
FIG. 3 illustrates one example of multiple camera views that can be fused into a three-dimensional (3D) model to create an immersive experience in accordance with embodiments of the present invention.

With reference to FIG. 3, shown is one example of multiple camera views that can be fused together into a three-dimensional (3D) model to create an immersive experience. According to various embodiments, multiple images can be captured from various viewpoints and fused together to provide a multi-view interactive digital media representation. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 306 along with their associated locations 322, 324, and 326, respectively, provide a rich source of information about object of interest 308 and the surrounding context that can be used to produce a multi-view interactive digital media representation. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a multi-view interactive digital media representation.

Figure 4:
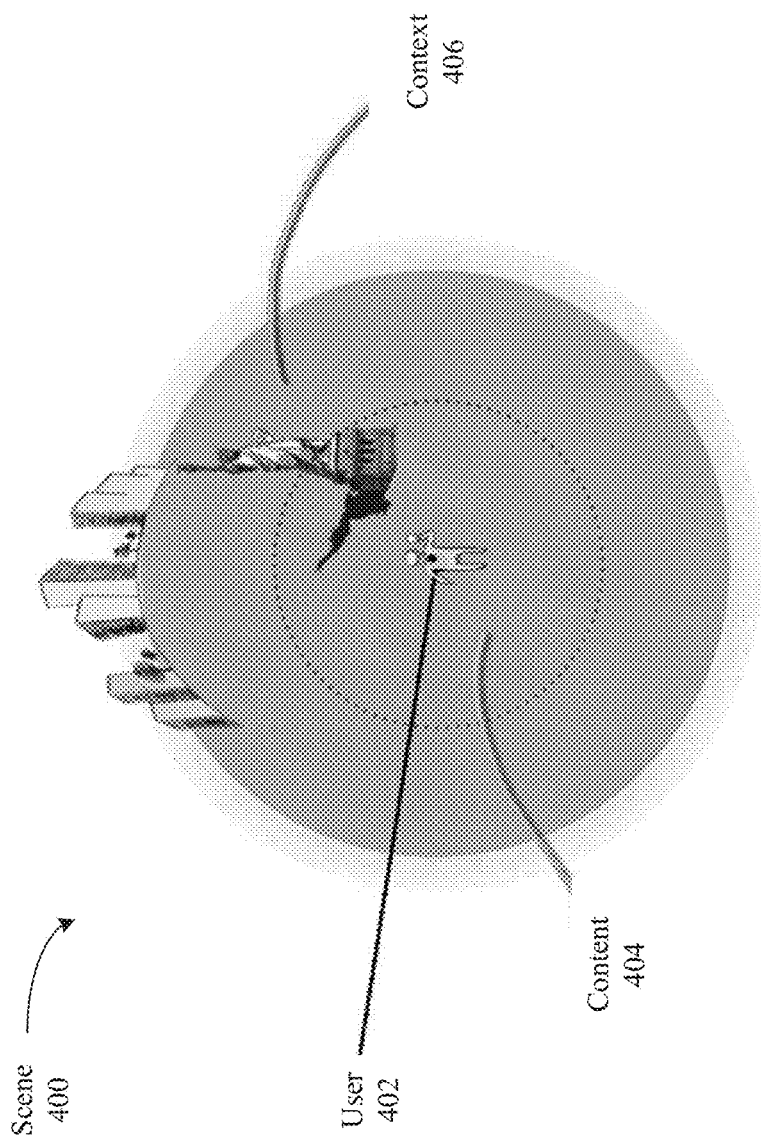
FIG. 4 illustrates one example of separation of content and context in a multi-view interactive digital media representation in accordance with embodiments of the present invention.

FIG. 4 illustrates one example of separation of content and context in a multi-view interactive digital media representation. According to various embodiments of the present invention, a multi-view interactive digital media representation is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a multi-view interactive digital media representation.

According to various embodiments of the present disclosure, the digital visual data included in a multi-view interactive digital media representation can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a multi-view interactive digital media representation may represent the content 404 as three-dimensional data, and the context 406 as a two-dimensional panoramic background. In other examples, a multi-view interactive digital media representation may represent both the content 404 and context 406 as two-dimensional panoramic scenes. In yet other examples, content 404 and context 406 may include three-dimensional components or aspects. In particular embodiments, the way that the multi-view interactive digital media representation depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the multi-view interactive digital media representation produced may have some characteristics that are similar to other types of digital media such as panoramas. However, according to various embodiments, multi-view interactive digital media representations include additional features that distinguish them from these existing types of digital media. For instance, a multi-view interactive digital media representation can represent moving data. Additionally, a multi-view interactive digital media representation is not limited to a specific cylindrical, spherical or translational movement. Various motions can be used to capture image data with a camera or other capture device. Furthermore, unlike a stitched panorama, a multi-view interactive digital media representation can display different sides of the same object.

Figures 5A, 5B:
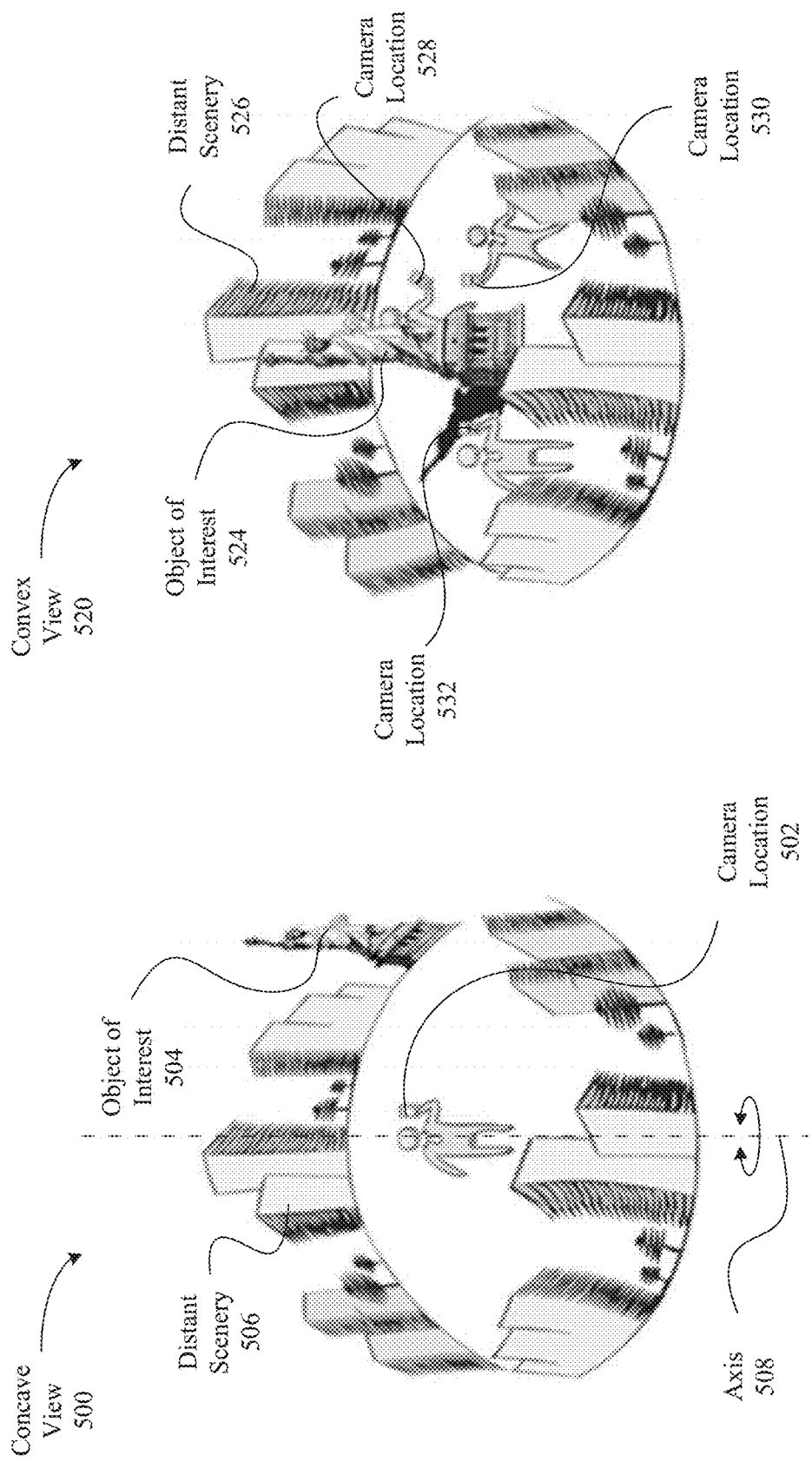
FIGS. 5A-5B illustrate examples of concave view and convex views, respectively, where both views use a back-camera capture style in accordance with embodiments of the present invention.

FIGS. 5A and 5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a multi-view interactive digital media representation.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A to 6D illustrate examples of various capture modes for multi-view interactive digital media representations. Although various motions can be used to capture a multi-view interactive digital media representation and are not constrained to any particular type of motion, three general types of motion can be used to capture particular features or views described in conjunction multi-view interactive digital media representations. These three types of motion, respectively, can yield a locally concave multi-view interactive digital media representation, a locally convex multi-view interactive digital media representation, and a locally flat multi-view interactive digital media representation. In some examples, a multi-view interactive digital media representation can include various types of motions within the same multi-view interactive digital media representation.

Figure 6A:
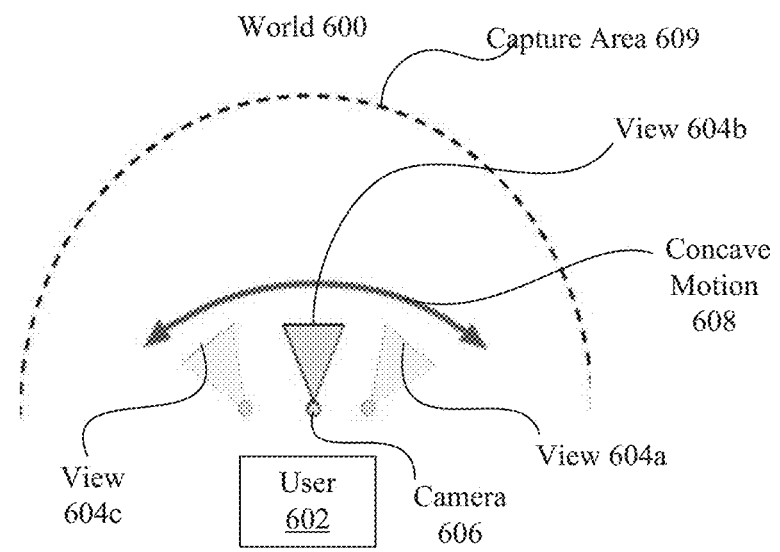
FIGS. 6A to 6D illustrate examples of various capture modes for multi-view interactive digital media representations in accordance with embodiments of the present invention.

With reference to FIG. 6A, shown is an example of a back-facing, concave multi-view interactive digital media representation being captured. According to various embodiments, a locally concave multi-view interactive digital media representation is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
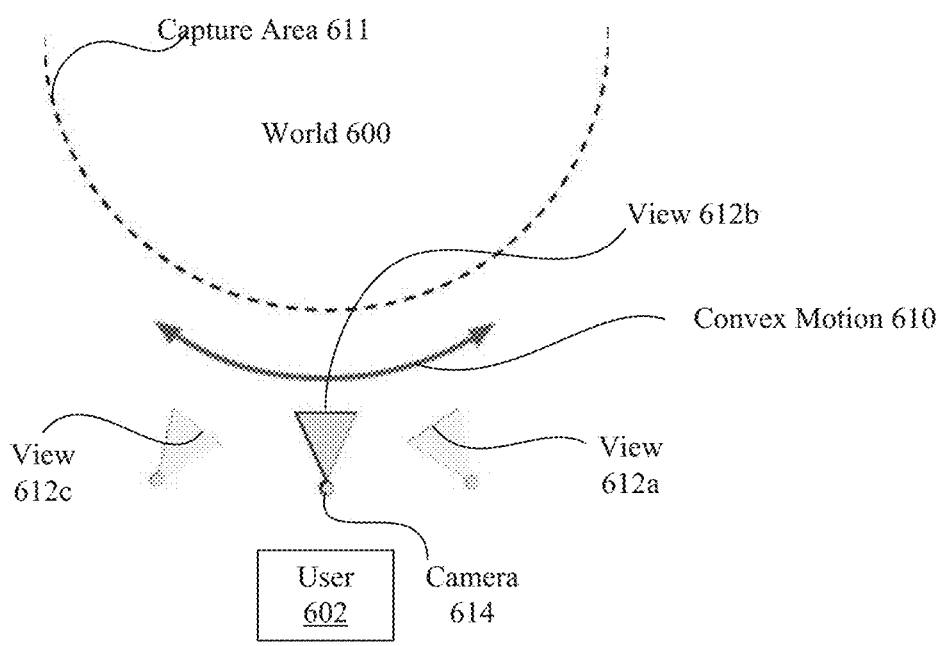

With reference to FIG. 6B, shown is an example of a back-facing, convex multi-view interactive digital media representation being captured. According to various embodiments, a locally convex multi-view interactive digital media representation is one in which viewing angles converge toward a single object of interest. In some examples, a locally convex multi-view interactive digital media representation can provide the experience of orbiting about a point, such that a viewer can see multiple sides of the same object. This object, which may be an "object of interest," can be segmented from the multi-view interactive digital media representation to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
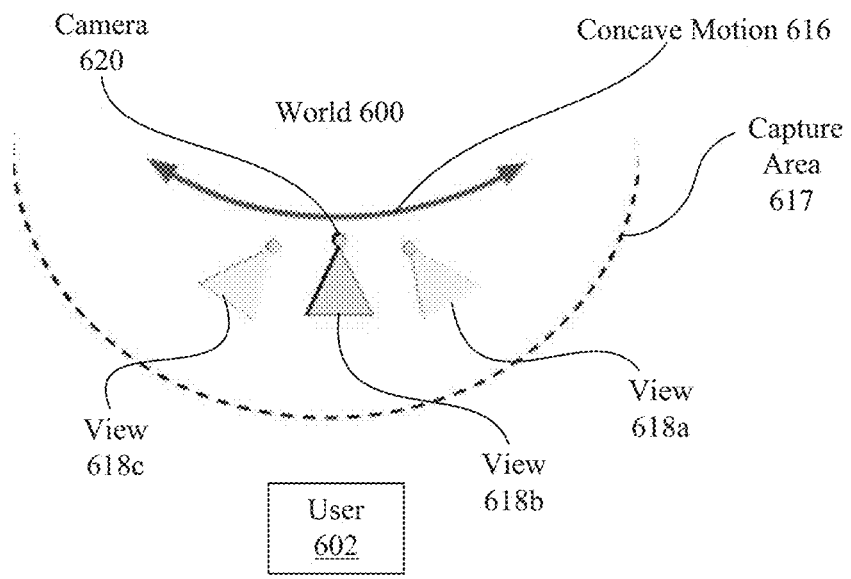

With reference to FIG. 6C, shown is an example of a front-facing, concave multi-view interactive digital media representation being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 608 such that the views 618a, 618b, and 618c diverge from each other in an angular sense. The capture area 617 follows a concave shape that includes the user at a perimeter.

Figure 6D:
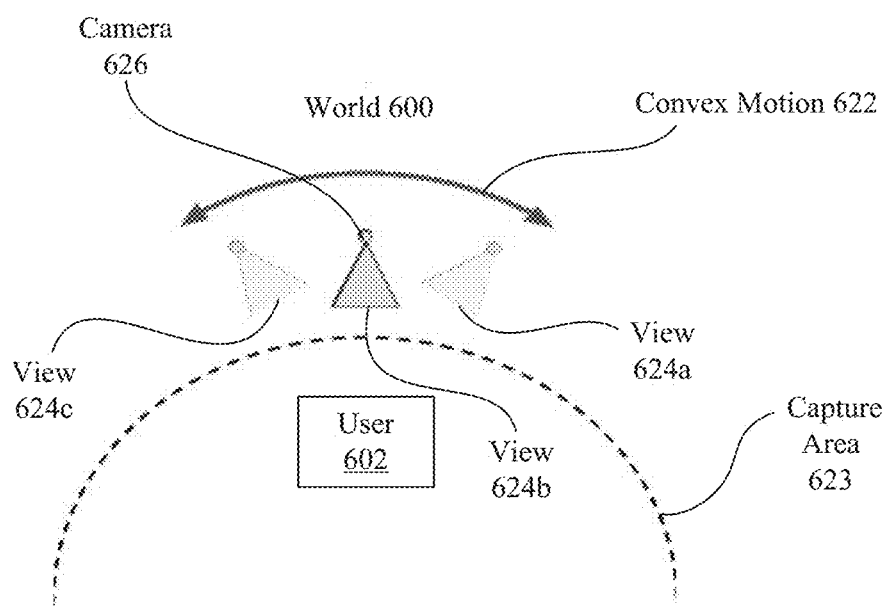

With reference to FIG. 6D, shown is an example of a front-facing, convex multi-view interactive digital media representation being captured. In the present example embodiment, camera 626 is facing user 602. The camera follows a convex motion 622 such that the views 624a, 624b, and 624c converge towards the user 602. As described above, various modes can be used to capture images for a multi-view interactive digital media representation. These modes, including locally concave, locally convex, and locally linear motions, can be used during capture of separate images or during continuous recording of a scene. Such recording can capture a series of images during a single session.

Next, with respect to FIGS. 7, 8A and 8B, a device with a camera and a sensor package is described. As described above, data from a sensor package, such as an IMU can be used to provide image stabilization. Further, data from the sensor package can be used as part of smoothing algorithms used to generate a MVIDMR as described below. Thus, some sensor capabilities and quantities that are derived from the sensors are described as follows.

IMU Data and Processing

In this section, devices, such as mobile devices, which including cameras and sensor packages are described. Image data from the camera and sensor data from the sensors can be used to generate an MVIDMR. FIG. 7 illustrates a sensor package 700 for determining orientation of a camera used to generate a MVIDMR. In one embodiment, the sensor package 700 can include a MEMS (Micro-Electro-Mechanical System) device 706. In particular embodiments, the sensor package 700 can be part of an IMU. Other types of sensor packages are possible and the example of a MEMS device 706 is provided for the purposes of illustration only.

The MEMS device 706 can include a plurality of sensors. For example, the MEMS device 706 can include a 3-axis accelerometer. The 3-axis accelerometer can be used to measure accelerations along the z axis 702a, the y axis 702b and the x axis 702c. In addition, the MEMs device can include a 3-axis gyroscope. The 3-axis gyroscope can be used to measure angular velocities, 704a (yaw) about z axis 702a, 704b (roll) about y axis 702b and 704c (pitch) about x axis 702c. In addition, a MEMs device can include an one or more axis magnetometer (not shown), such as 3-axis magnetometer. In various embodiments, a sensor package 700 can include one or more of accelerometers, gyroscopes, magnetometers or combinations thereof.

The sensor package 700 can output sensor data 708. An IMU, which can include a sensor processing system, such as 710, can receive the sensor data 708 and determine an orientation of a device. For example, gyroscopic data 712 can be integrated to determine angular changes about the pitch, roll and yaw axes. Magnetometer data 714 can be used to determine a heading or direction 724 relative to the Earth's magnetic poles. Accelerometer data 716 can be used to determine a direction of the Earth's gravity vector. Further, accelerometer data 716 can be integrated once to determine a velocity of the device and twice to determine distance changes.

The orientation 722 of a device relative to a reference coordinate system can be described with three angles, i.e., pitch, roll and yaw angles. For example, the accelerometer data 716, such as from a 3-axis accelerometer, can provide a pitch and roll orientation of a device relative to the Earth's gravitational vector. The magnetometer data 714, if available, can be used to provide a yaw angle. Gyroscopic data 712 can be used to provide changes to the pitch, roll and yaw angles. Thus, if an initial orientation of a device is known and it begins to rotate, the gyroscopic data can be used to determine an orientation of a device as a function of time.

FIG. 8A illustrates a mobile device 720 with a sensor package, such as the MEMs device 706 shown in FIG. 7. For example, the MEMs device 706 can be installed in mobile device 720 with its axes aligned as depicted in the FIG. 8A. The mobile device 720 can include one or more cameras (not shown) facing in the negative Z direction along axis 702a and one or more cameras facing in the positive Z direction. An exemplary field of view of at least one camera facing in the negative Z direction is indicated by rays 725.

When the fields of view of two or more cameras overlap, knowledge of the distance between the cameras can be used to obtain distance data, i.e., the distance of the camera to objects captured in the image data. For example, the mobile device 720 can include two cameras facing in the negative Z direction with overlapping fields of view. Where the fields of view overlap, the distance to objects from the cameras, and hence mobile device 720, can be estimated based upon a comparison of image data taken from both cameras. In another example, a structured light system can be used, such as a Kinect™ sensor. The structured light system can use a light source, such as an infrared light generator and a sensor for detecting light reflected from objects.

When mobile device 720 is a rigid body, then based upon a position and orientation of the camera relative to the body of mobile device 720, the orientation of the camera can be determined based upon the orientation of body of the mobile device 720. In this example, a camera is aligned with the Z-direction at some position on the face of the body of device facing in the negative Z direction. As described with respect to FIG. 8A, the orientation of a body of the device can be determined from the sensor package. Hence, based upon its position on mobile device 720, the orientation of the camera can be derived from data from the sensor package.

In other examples, a camera can be configured so that it is not aligned with negative Z direction, such as pointing at an angle relative to the negative Z axis. For instance, the mobile device 720 a first camera can be aligned with the negative Z axis and then one or more additional cameras can be configured to point at angles relative to the negative Z direction. The light gathered from the multiple cameras can be combined to provide a wider field of view. In another example, a camera can be designed to mechanically sweep through an angle to provide a wider field of view.

In yet another example, mobile device 720 may not be a rigid body. For example, mobile device 720 can include a flexible housing. When the housing is flexible, sensors may be included which measure an amount of bending. Based upon the amount of bending determined from the sensors and data from a sensor package, such as a sensor package on an IMU, an orientation of the camera on a flexible body can be determined.

Next, examples are considered where the mobile device 720 is allowed to move generally in 3-D space. FIG. 8B illustrates pitch and roll of a mobile device 720 and angle changes as a function of time relative to the gravity vector during image acquisition for MVIDMR generation. The direction of the gravity vector is indicated by 802a. An orthogonal coordinate system associated with the gravity vector is indicated by 802b and 802c. The gravity vector can be used to determine a ground plane on which a person is resting, such as a surface on which a person is standing.

The direction of the body centered coordinate system for mobile device 720 is indicated by 804a, 804b and 804c. The direction of the camera is in the negative Z direction as in the previous pictures. The pitch and roll orientation of the mobile device 720 relative to the gravity vector can be determined using sensor data from the 3-axis accelerometer. As described above, if a magnetometer data is available, then it may be possible to obtain yaw data.

The gyroscopic data can be used to determine a roll rate of the mobile device 720 about axis 804b and the pitch rate about 804c. The roll rate can be integrated to obtain an amount of roll between a first time and a second. The pitch rate can be integrated to obtain an amount of pitch between a first time and a second time.

In one embodiment, the angular rotation amount of mobile device 720 during an MVIDMR image acquisition can be determined using just the roll rate or pitch rate. If the device is orientated in a portrait mode and the user plans to pan around an object with this orientation, then the roll rate from the gyroscopic data as a function of time can be integrated to determine a total roll angle amount as a function of time. In one embodiment, negative roll rates can be ignored for the purposes of determining the total roll angle amount. The total roll angle amount as a function of time can be used to estimate the angular view of an object that has been captured during image acquisition.

If the mobile device 720 is orientated in a landscape mode and the user plans to pan around an object with the device in this orientation, then the pitch rate from the gyroscopic data as a function of time can be integrated to determine a total pitch angle as a function of time. In this example, negative pitch rates can be ignored for the purposes of determining the total pitch angle amount. The total pitch angle amount as a function of time can be used to estimate the angular view of an object that has been captured during the image acquisition process.

In one embodiment, the MVIDMR system can present a user with a selection of a type of path for the device to follow and an orientation of the device that is to be used during the path. Based upon the input provided by the user, the MVIDMR system can determine whether to determine the total pitch angle amount or the total roll angle amount for the purposes of determining an angular view amount of an object that has been captured as a function of time. In these embodiments, as roll rate data and pitch rate data is being integrated, the orientation of the device as a function time may not be needed. However, a starting time to begin the integration of the roll rate data or the pitch rate data and an ending time may have to be determined. In one embodiment, the start and stop can be determined based upon a user selecting a button in an input interface, i.e., the user can select a button to start the image capture and end the image capture.

In another embodiment, the sensor data from the 3-axis accelerometer can be used. The 3-axis accelerometer can be used to determine a roll and pitch orientation of the mobile device 720 relative to the gravity vector (gx, gy and gz) as a function time. For example, in FIG. 8B, the device is pitched by pitch angle 808 about the gx axis 802c and rolled about the gravity vector gz 802a by a roll angle 806 at time $t_1$. The yaw angle amount about the gy axis 802b is not determined using the 3-axis accelerometer data. As described above, it can be set to an arbitrary value such as zero degrees.

At $t_1$, the first value of angles 806 and 808 provide an orientation of the Z axis 804a (or negative Z axis) in the coordinate system associated with the gravity vector (802a, 802b and 802c). As described above, a camera on mobile device 720 can be orientated in the negative z direction. At $t_2$, the magnitude of the value of the pitch angle 808 can increase or decrease relative to its value at $t_1$ and the magnitude of the value of the roll angle 806 can increase or decrease relative to its value at $t_1$. The values of the pitch angle 808 and roll angle 806 at time $t_2$ again determine the orientation of the negative z vector in the coordinate system associated with the gravity vector.

In one embodiment, at different times, such as between $t_1$ and $t_2$, an angle value can be determined between the 3-D camera direction vectors, which is the negative z direction in the camera based coordinate system. In this example, the 3-D camera direction vector at each time can be determined in the gravity based coordinate system (802a, 802b and 802c) using the pitch and roll angles about the gx 802c and gz 802a axes obtained from the accelerometer data. The yaw angle about the gy 802b vector can be set to zero or some other fixed value (no yaw change as a function of time). With pitch, roll and yaw angles in the gravity based coordinate system for 3-D camera vector known as a function of time, the change in the angle between the 3-D camera direction vector at two different times, such as between times, $t_1$ and $t_2$, can be determined.

The angle changes can be summed to determine a total angle change as a function of time. The angle change is approximately around the gravity vector gz 802a. The total change in angle can be used to estimate an angular view of an object captured by the camera. Thus, the angular view of the object captured as function of time can be determined and output to a display screen. Like the examples described above, a rotation direction that is needed along the path to keep the object in view of the camera can be determined, i.e., clockwise or counter clockwise. Further, angle changes, in the direction that is not needed, can be ignored for the purposes of determining the angular rotation amount in the rotation direction that is needed to keep the object in view of the camera.

In another embodiment, the angle changes can be projected into a particular plane. For example, a circle 812 is shown in a plane perpendicular to the gravity vector. The 3-D camera direction vector can be projected into this plane. Then, the angle changes of the 3-D camera direction vector projected into this plane from time to time can be determined, such as 810. Like the examples described above, a rotation direction that is needed along the path to keep the object in view of the camera can be determined, i.e., clockwise or counter clockwise. Further, as described above, angle changes in the plane in the direction that is not needed can be ignored.

Skeleton Detection and Body Segmentation

Figure 9A:
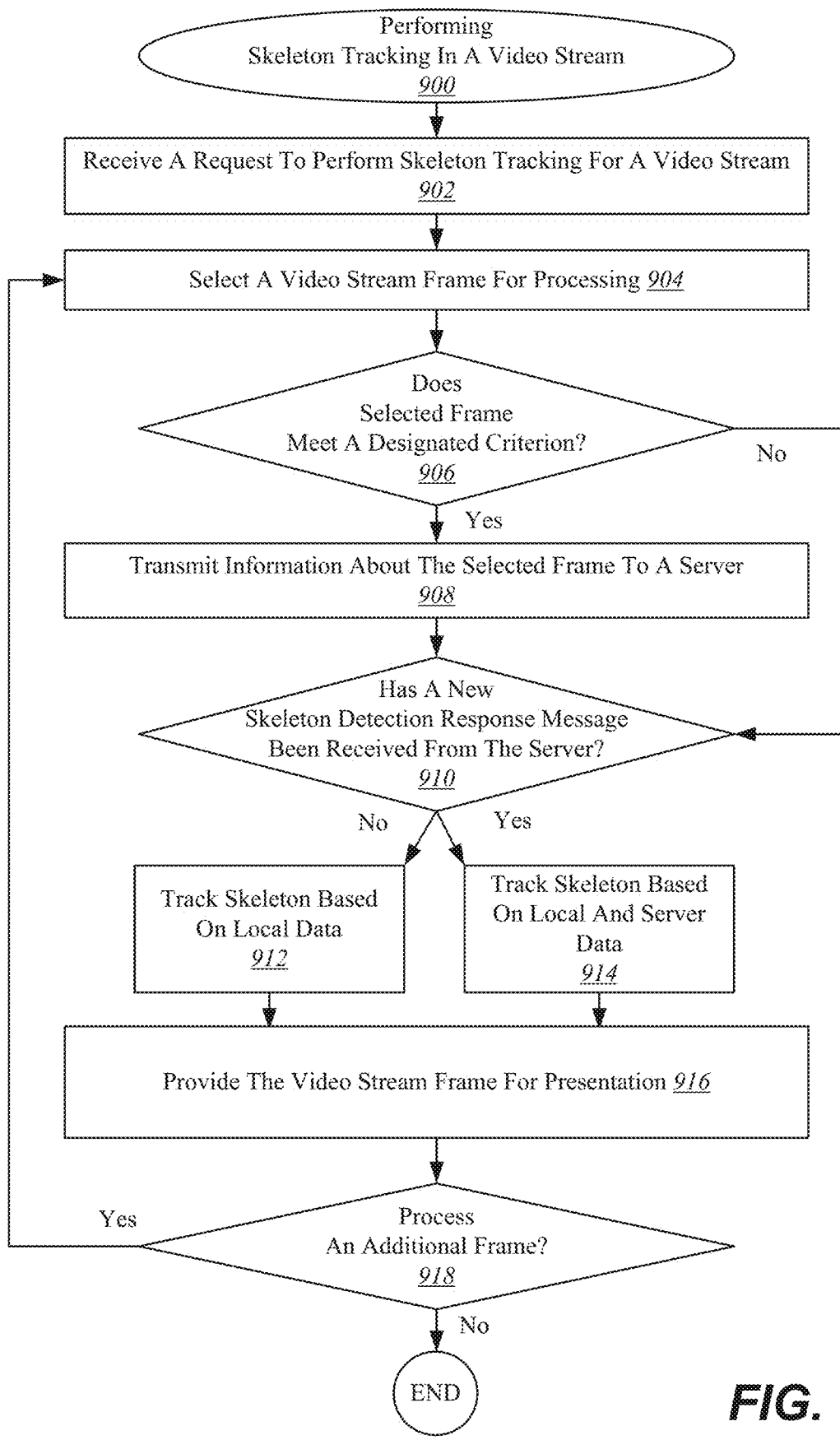
FIG. 9A is a block diagram of a method of performing skeleton detection using a client and server architecture in accordance with embodiments of the present invention.
Figure 9B:
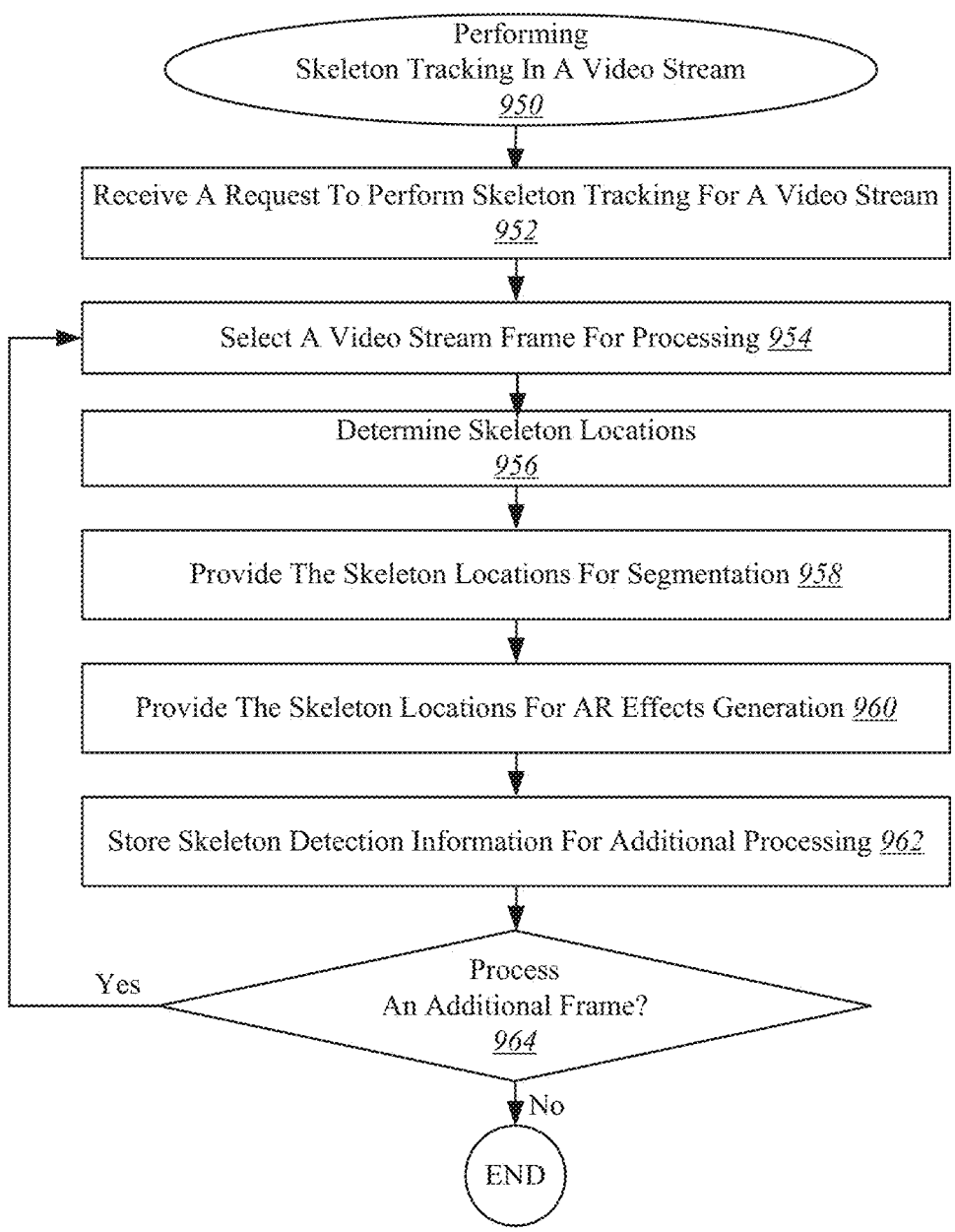
FIG. 9B is a block diagram of a method of performing skeleton detection on a device in accordance with embodiments of the present invention.
Figure 10:
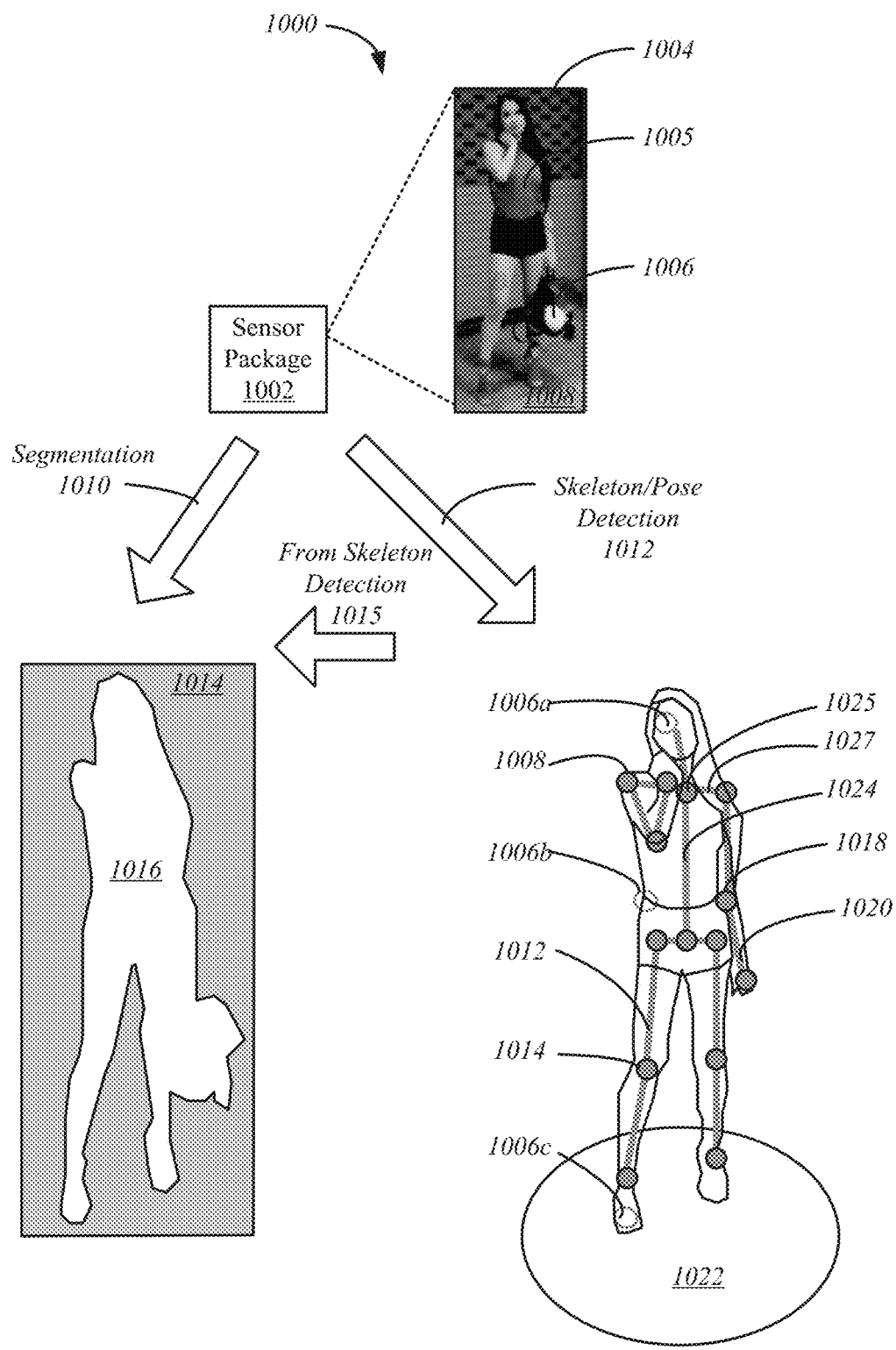
FIG. 10 illustrates an example of skeleton detection and background segmentation in accordance with embodiments of the present invention.
Figure 11:
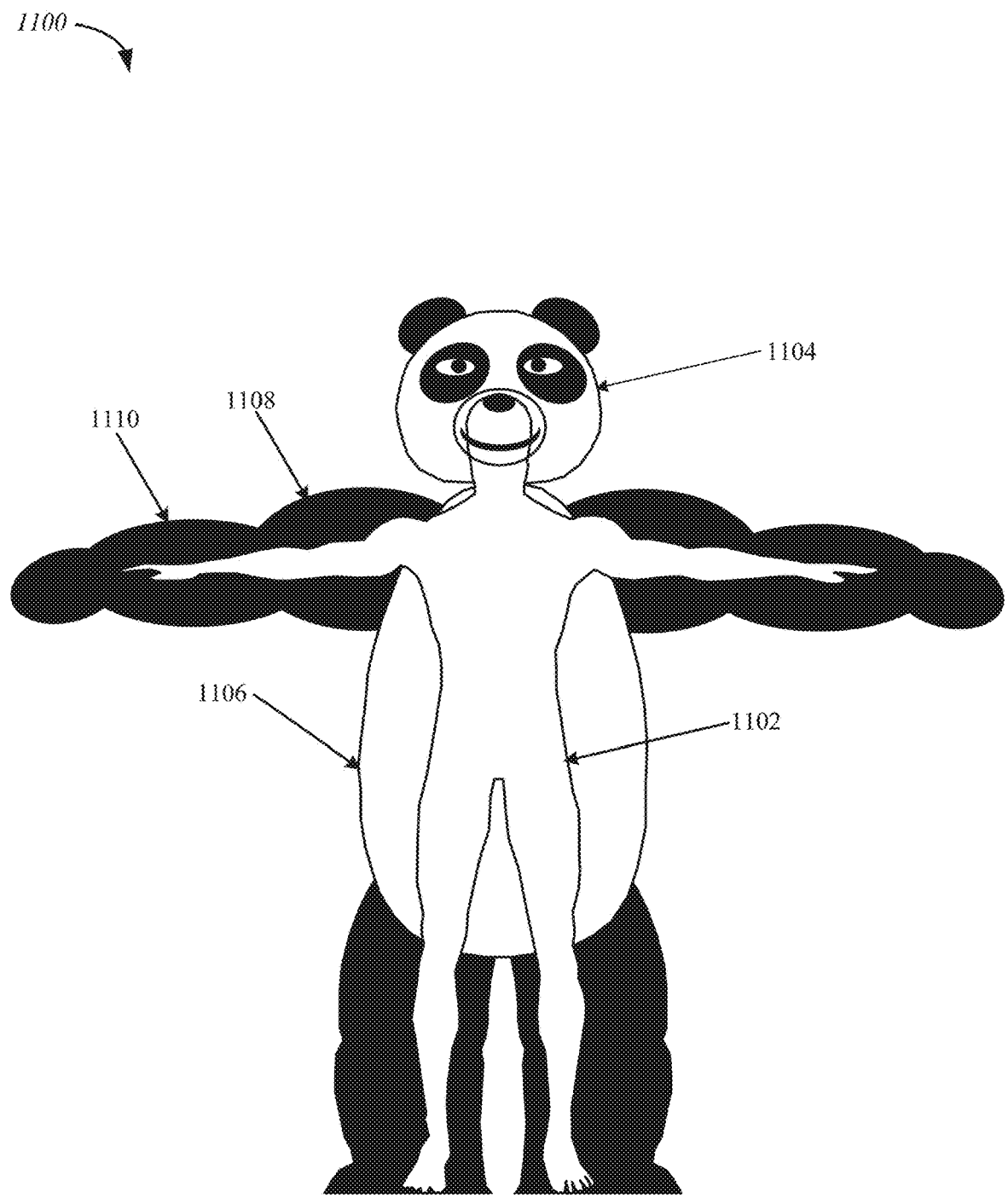
FIG. 11 illustrates an example of using skeleton detection to augment a body with visual effects in accordance with embodiments of the present invention.

Described in this section are methods for detecting a "skeleton" of a person and segmenting the body of the person from the background of an image in a video stream are described with respect to FIGS. 9, 10 and 11. Methods of skeleton detection and body segmentation are described with respect to FIGS. 9 and 10. In some embodiments, the body segmentation can help with certain aspects of the skeleton detection and vice versa. With respect to FIG. 11, based upon a detected skeleton, methods of replacing parts of person via augmentations of image data are described. The image data can be associated with video frames from a video stream captured using a mobile device.

As will be described in more detail in the following section, with the skeleton of the body determined, effects which are anchored to a location on the body can be generated. For example, skeleton tracking can be used to anchor a structure like wings to the back (e.g., along the spine) of a person or fins to the arm of a person that appears in a video frame. The structure then extends from the body at the location where the structure is anchored to the body. In another example, an object can be rendered into a person's hand, such as a sword. Also, the body segmentation can allow image effects to extend into a background surrounding the person. In one embodiment, as described with respect to FIG. 11, the effects can be based upon a determined pose of the person as based upon their determined skeleton position.

With reference to FIG. 9A, shown is one example of a process for performing skeleton tracking in a video stream. According to various embodiments, the process shown in FIG. 9A may be performed at a client machine in communication with a server. An example of a client machine, such as mobile device, in communication with a server, is described with respect to FIG. 18.

The two devices may coordinate to split the processing operations required to perform skeleton detection and tracking in a live video stream. A live video stream can include the recording of a plurality of live images. In another embodiment, the operations can be performed solely on the client side. In yet another embodiment, the skeleton tracking can be performed solely at the server side and information about the skeleton downloaded to the client.

In yet other embodiments, a portion the operations can be performed in real-time. For example, a first portion of the operations can be performed in real-time to provide a real-time preview of a MVIDMR with effects which utilize skeleton detection and body segmentation and second portion of the operations can be performed off-line. The off-line operations can improve characteristics of the MVIDMR when it is subsequently viewed. The off-line and real-time operations can be performed solely on a client device or distributed between a client device and a server.

Returning to FIG. 9A, in the present example, a skeleton tracking process 900 begins with the client device receiving a request to perform skeleton tracking in a video stream at 902. In some implementations, the request may be generated based on user input requesting skeleton tracking. Alternately, the request may be generated automatically when the client device detects that a video stream is being captured or displayed at the client device. Next, the system selects a video stream frame for processing at 904. According to various embodiments, video stream frames may be processed sequentially. For instance, each frame in a live video stream may be processed prior to presenting the video stream to the user so that a filter may be applied or a determination may be made based on the skeleton tracking.

At 906, a determination is made as to whether the selected video frame from the video stream meets a designated criterion. In some implementations, any of a variety of criteria may be used to select a video stream frame for transmission to the server. For example, if the filtering process has just been initiated, then the client device may select the first available video stream frame for processing. As another example, one or more criteria may be applied to select the video stream frame. For instance, the client device may select a video stream frame that exceeds a threshold level of light or detail to allow for sufficient information for applying a filter. As yet another example, the client device may select a video stream frame for processing after a designated period of time or number of frames have passed since the last video stream frame was transmitted to the server.

If the selected frame meets the designated criterion, then information about the selected frame is transmitted to the server at 908. According to various embodiments, a variety of information may be transmitted to the server. In one example, some or all of the image data associated with the frame may be transmitted. For instance, the entire frame may be transmitted. Alternately, the frame may be compressed or down sampled to reduce bandwidth usage.

In a second example, IMU information such as gyroscopic data, compass data, or accelerometer data may be transmitted (See FIGS. 7, 8A and 8B). This IMU information may provide data about the position, velocity, acceleration, direction, rotation, or other such characteristics of the device around the time that the frame was captured. In a third example, GPS information may be transmitted. In some implementations, the specific information transmitted to the server may depend on the type of processing being performed at the server and/or the type of filter being applied at the client device.

Next, a determination is made at 910 as to whether a new skeleton detection response message has been received from the server. The server can send messages that include information for identifying a skeleton at the client device. However, these skeleton detection response messages can be sent at a lag when compared with the live processing and presentation of the video stream.

If no new skeleton detection message has been received, then at 912 the skeleton can be tracked based on existing data that is locally available at the client machine. In some embodiments, tracking a skeleton based on locally available data may involve propagating information from one frame to another. For instance, a current frame may be analyzed to identify the same feature (e.g., a corner or an area of color indicative of a joint) that was identified in the preceding frame.

According to various embodiments, a multitude of approaches can be used track a skeleton from one frame to another. One such approach is frame-to-frame tracking, which can be based on information that may include, but is not limited to: tracking of sparse key points, dense or sparse optical flow, patch tracking, tracking of geometric instances, or other such information. Another such approach is frame-to-frame matching, which involve techniques that may include, but are not limited to: descriptor based matching of key points which are detected in both frames, patch matching, detection and matching of higher level features (e.g. a human face), or other such techniques. Both approaches can focus the tracking and matching efforts on regions or features of interest if such regions or features are identified.

In some implementations, a special processing cases the time from the first frame that is sent to the server to the frame when the corresponding results are received back from the server. Since there is no server-created scene interpretation available until the results of the first frame are received, the client device may not know which specific information in the scene needs to be propagated. Various approaches are possible for handling this situation. In one example, all or most information in the frame is equally propagated. For instance, key points may be distributed over the whole image. In a second example, an efficient method for estimating one or more regions of interest may be applied on the client device. For instance, a bounding box for the region may be computed. Then, the propagation of information may be concentrated on the region or regions of interest. In a third example, matching methods may be applied to directly match the information extracted from the first frame to the frame after which the results from the server are available.

If instead a new skeleton detection message has been received, then at 914 the skeleton can be tracked based on both the locally available data and the data provided by the server. According to various embodiments, new information received from the server may be combined with the information propagated from frame to frame. To accomplish this goal, various approaches may be used. In one example, old information may be replaced with new information received from the server. In a second example, old information may be combined with new information in a weighted fashion, for instance based on relative confidence values associated with server results and propagation results.

According to various embodiments, the specific operations performed to track a skeleton may depend in large part upon the specific type of filter being applied. In one example, a caption bubble may be applied to a video of a person when the person exhibits a particular pose. In this first example, the server may perform skeleton detection to facilitate pose estimation while the client device tracks low-level image features such as a point associated with a person's elbow or a surface area that is part of the background. Then, the client device may combine the low-level feature tracking information with the skeleton detection information provided by the server to determine whether the person is positioned in the particular pose.

In a second example, a filter may be applied to a vehicle based on its position (e.g., crossing a finish line). In this second example, the server may perform segmentation to identify the segmentation and characteristics of the vehicle, while the client device tracks low-level features such as shapes to propagate the location of the vehicle between communications with the server. In particular embodiments, a pose may be dynamic rather than static. For instance, a pose may include a succession of skeleton arrangements that follow one another. Examples of such poses may include, but are not limited to, hand waving or hand clapping, as indicated by a succession of frames in which a hand or hands moves between different frame areas.

In computer vision, image segmentation is the process of partitioning a digital image into multiple segments (sets of pixels, also known as super-pixels). The goal of segmentation can be to simplify and/or change the representation of an image into something that is more meaningful and easier to analyze. Image segmentation can be used to locate objects and boundaries (lines, curves, etc.) in images. For example, the outline of a person or the outline of a vehicle described in the previous paragraph.

More precisely, image segmentation can be the process of assigning a label to every pixel in an image such that pixels with the same label share certain characteristics. The result of image segmentation can be a set of segments that collectively cover the entire image, or a set of contours extracted from the image (see edge detection). Each of the pixels in a region can be similar with respect to some characteristic or computed property, such as color, intensity, or texture.

Another example can be depth ordering of information. For example, a group of pixels can be ordered based upon depth information associated with the image data. The depth ordering can distinguish one or more objects in an image from other image portions, such as a background, a structure used to render an effect, the floor, a person or other objects. In on embodiment, the depth ordering can also be inferred from the camera motion and the tracking of key points in the image data. Depth data for an image can be provided from a sensor package, such as a sensor package that utilizes two cameras or a sensor package which utilizes structured light.

In one embodiment, depth information can be determined on a pixel by pixel basis. For example, data from two cameras with an overlapping field of view can be used to estimate depth data from the pixels in the overlapping fields of views. In other embodiments, depth data can be estimated for groups of pixel in an image. For example, an object, such as a person, can be identified in an image and segmented from the background. The object, encompassing a first set of pixels, can be assigned one or more depth values and the background, encompassing a second set of pixels can be assigned one or more second depth values that are used to indicate it is behind the object. Third depth values can be determined for a structure used to render an effect. The first, second and third depth values can be used to determine occlusions between the background, object and structure. These occlusions can change depending on the viewing angle that is used to view the background, object and structure.

Returning to FIG. 9A, since humans are not rigid, but articulated objects, specific techniques may be used to track human joints. For example, the skeleton detection information received from the server may be used to select different image points to track from each skeleton limb. The points associated with each limb can then be tracked frame-by-frame, for example with a Lukas Kanade method. An example of such a method is described in "An Iterative Image Registration Technique with an Application to Stereo Vision" by Bruce D. Lucas and Takeo Kanade, published in International Joint Conference on Artificial Intelligence, pages 674-679, 1981.

The obtained point motions may then be used to estimate a displacement for every skeleton joint. To account for tracking drifts, some physical constraints can be imposed to the tracked skeleton to limit the displacement of joints or the orientation of limbs. This system can allow the tracking of one or more people in the video since all people can be detected by the server and tracked by the client. New detections from the server can be matched with existing tracks in the client, for example with a global nearest neighbor approach based on the overlap of their bounding boxes.

After skeleton tracking, the tracked frame can be provided for presentation at 916. Providing the filtered frame for presentation may involve displaying the filtered frame as part of the video stream on a display screen. In some implementations, providing the video stream frame for presentation may involve applying a filter to the frame based on skeleton tracking. Alternately, or additionally, the video stream frame may be stored to memory and or persistent storage for later playback. In a different example, the video stream frame may be transmitted to a separate device for presentation, such as an augmented reality or virtual reality device in communication with the client device.

Finally, a determination is made at 918 as to whether to process an additional frame. In particular embodiments, the system may continue to process additional frames until one or more criteria are met. These criteria may include, but are not limited to: receiving user input indicating a request to stop skeleton tracking, determining that the video stream has terminated, and determining that the video stream no longer includes a skeleton to be tracked.

In some implementations, skeleton detection may be used to aid in pose detection, which may be performed at the client device or at the server either at a delay or in real time. For instance, pose detection may be performed as part of operations 912 or 914. In pose detection, the detected human skeleton may be used to determine whether the arrangement of the skeleton at a particular point in time matches one or more of a discrete set of human poses. In some implementations, pose detection may be accomplished by first estimating a homography from the skeleton joints that in order to frontalize the skeleton for a better pose. Then, pose detection may be performed by analyzing spatial relations of the frontalized joints. Next, a temporal filtering method may be applied to remove spurious detections. In particular embodiments, such techniques may be applied to detect poses for either individuals or for multiple people.

In some embodiments, pose detection may involve scaling or stretching location information associated with the detected skeleton and then comparing the location information with the predetermined location information associated with specific poses, where a high degree of similarity between the detected skeleton information and the predetermined skeleton pose information would indicate a match. When pose detection is used, different poses may trigger different events, such as the application of specific filters to a video stream. Alternately, or additionally, the detection of a specific pose may trigger the recommendation of one or more filters to the user for the user to select. In either case, pose detection may be used to suggest or identify start and/or end times for an effect as well as the type of effect that could be added.

In the example described above, a processing architecture is described where skeleton detection processing can be performed between a client and server. In another embodiment, described below with respect to FIG. 9B, the skeleton detection can be performed on a computing device, such as a mobile device, in real-time, such as while image capture is being performed for generation of an MVIDMR. The skeleton detection information can be used to augment an object, such as a person, with effects. As is described below with respect to FIGS. 13 and 15, a preview of a selected effect can be provided in real-time as image data is being captured.

In 950, a method of performing skeleton tracking in a video stream is described. In 952, a request can be received to perform skeleton tracking for a video stream. In 954, a frame from the video stream can be selected for processing. In 956, using one or more methods, such as methods described above with respect to FIG. 9A, skeleton detection can be performed and information regarding skeleton locations detected in the image data can be determined. The skeleton information can include the positions of joints in the images, such as elbows, neck, shoulder, knees, waist, ankle, wrist, etc.

In 958, the skeleton detection information in 956 can be received by a module configured to perform segmentation. In one implementation of segmentation, the boundary of an object can be separated from a background of the object. For example, the body of a person can be separated from a boundary surrounding the person. The skeleton detection information can be used by the segmentation module to perform segmentation of an object from a background. Further details of segmentation methods are described below with respect to FIG. 10.

In 960, the skeleton location information can be received by an augmented reality effects module. The AR effects module can be configured to use the skeleton location information to generate AR effects. The skeleton location information can be used to determine a location in the image where to add the effect in the image data. The AR effects module can also utilize information obtained from the segmentation module. Additional details of the skeleton detection module, the segmentation module, the AR effects module and their interactions are described below with respect to FIGS. 15, 16 and 17.

As an example, in one effect, wings can be attached to the body of the person. In the case of wings, the wings can anchored to the spine of the person at some location where the skeleton location information identifies where the spine runs through the image data. A determination can be made as to where to attach the wings to the spine, such as a location where a line drawn through the detected shoulder joints crosses the spine (this location 1025 and a spine segment 1024 are shown below in FIG. 10). Then, the wing effect can be drawn as if the wings emanate from this location. The wing effect is one example that can utilize skeleton information and is provided for the purposes of illustration only. For example, other effects are described are described in more detail with respect to FIG. 11.

When drawing the wings, the skeleton detection can also be used to size the effect in the image. For example, the size of the wings might be determined based upon a distance between two locations on the body, such as a length of the spine, a length the torso or a length of the waist, as determined from the skeleton detection. For example, the height of the wings can be a fraction of (less than 1) or multiplier times (greater than 1) of the length of the spine. The width of the wings can be similarly a fraction of or multiplier times the width of the torso. In general, a length, i.e., a distance between two locations on an object can be determined (the length can be a value in pixel dimensions) and based upon the length, an effect can be sized.

In 962, the skeleton detection location information can be stored. Then, in 964, an additional frame can be processed. In some embodiments, the skeleton information can be used for additional processing, such as the processing performed when an MVIDMR is generated. During the additional processing stage, the skeleton detection information determined for each frame of image data can be further refined.

For example, smoothing can be performed, such that variations in the detected skeleton locations between frames are reduced. Thus, in one embodiment, in a first pass, the skeleton detection locations can be based upon a single frame of data. This approach can be used during a preview stage where the augmentation of image data with an effect is previewed.

In a second pass, such as during smoothing, which can be performed during the additional processing stage, the skeleton detection locations for a frame can be affected from skeleton detection information determined from adjacent frames. In more detail, in smoothing, the changes in determined skeleton locations can be determined from one frame to the next frame in a series of frames, such as a series of frames used in an MVIDMR. Then, new skeleton locations can be determined for the series of frames such that the variations in the determined skeleton locations vary less from frame to frame.

The skeleton locations can be used to render augmented reality effects, such where they are placed in the images. Thus, the smoothing can affect the presentation of the AR effects. This process can be referred to as skeleton-batch smoothing (see 1602 in FIG. 16). An MVIDMR can be generated which utilizes the smoothed data.

In the example above, a skeleton detection is described for a single person, background segmentation and augmentation with effects is described for a single object, such as a person. In alternate embodiments, these methodologies can be applied to multiple objects that appear in frames of a video stream. For example, a video stream can includes frames with multiple people and a skeleton detection can be performed on the multiple people in the frames. In addition, a background segmentation can be performed which determines the outline of the multiple people so that they can be distinguished from the background and each other. Further, effects can be generated and applied to each of the multiple people in the frames. For example, wings can be applied to the multiple people appearing in the frames.

In one embodiment, a selection can be received to augment one or more of the multiple people with the same or different effects. For example, based upon a received selection, a first person in a frame can be augmented with a first effect and a second person in the frame can be augmented with a second effect different from the first effect. In another example, based upon a received selection, a first person in a frame can be augmented with a first effect whereas a second person may not be augmented with an effect. In yet another example, the first person and second person in the frame can be augmented with the same effect.

In another example, a video stream can include multiple frames with multiple cars. Using segmentation, the cars can be distinguished from each other and the background. Then, the background can be replaced or all or a portion of the cars can be augmented with effects.

FIG. 10 illustrates an example 1000 of skeleton detection and background segmentation. A sensor package 1002 records sensor data including image data 1008. The image data includes a first object, which is a person 1005. A background 1004 surrounds the person 1005. The background includes a wall and a floor on which the person is standing. The person 1005 in the image is holding a second object 1006, which is a bag.

In one embodiment, the sensor package 1002 can be associated with a mobile device. The sensor package can include one or more cameras. In one embodiment, a video stream can be recorded where the person is viewed from different angles. When two cameras are present, depth data, such as a distance to each pixel in the image, can be determined.

The sensor package 1002 can also include an IMU (e.g., see FIG. 7). The IMU may allow a position and/or orientation of the sensor package 1002 while it is recording the image data to be determined. In on embodiment, the IMU data can be used to determine a ground plane, which is perpendicular to the gravity vector as determined from an accelerometer. The ground plane can be used to determine information about the floor on which the person 1005 is standing.

Data from the sensor package 1002, such as the captured and/or processed image data, can be used to do body segmentation of the body from background. Body segmentation can involve determining an outline of the body 1016. Further, it can involve determining parts of the body, such as face and arms and their locations in the image data. The area outside of the body 1014 can be considered the background. The outline of the body 1016 can change from image to image as a position of a person or a position of a camera recording the person changes with time.

In one embodiment, raw input image from a single camera can be used in conjunction with a deep neural network for segmentation. The neural network can be trained to recognize bodies in images. Neural networks trained to recognize other types of objects, such as cars or animals, can also be utilized and the example of a person is provided for the purposes of illustration only. Weighting factors for a plurality of different neural nets trained to recognize a plurality of different objects can be stored on a mobile device and/or a remote device. For example, first weighting factors for a first neural net trained to recognize people, second weighting factors for a second neural net trained to recognize dogs, third weighting factors for a third neural net trained to recognize horses and fourth weighting factors for a fourth neural net trained to recognize cars can be stored on a mobile device.

In another embodiment, information 1015 from the skeleton detection 1012 can be used to implement a first-cut segmentation of body 1016. In yet another embodiment, depth data from a dual camera and one raw image can be used to do the body segmentation. Typically, there is a sharp change in depth around the edges of the person. The change in depth can be used to determine the segmentation of the person. In some instances, segmentation from one frame can be propagated to a neighboring frame. In one embodiment, a system can be configured to merge propagated segmentation to improve inter-frame consistency of segmentations. For example, smoothing algorithms can be applied to reduce differences in the segmentation between images.

In a particular embodiment, a sparse matrix of key points can be determined for each frame. The key points can be used to develop a triangular mesh for each frame. The pixels in each triangle defined by the key points can be used to define "super pixels." A super pixel can be a grouping of one or more pixels related in some way.

The key points can be tracked from a first frame to a second frame in a sequence of video images. The position of the key points in the first frame can be used to define a first triangular-based mesh. The position of the key points in the second frame can be used to define a second triangular-based mesh.

The first triangular-based mesh associated with the first frame and the second triangular-based mesh associated with the second frame can be use used to define a transformation between the first frame and the second frame, such as an affine transformation. The transformation can propagate optical flow information between the first frame and the second frame and can provide a starting point for the segmentation of the second frame. This methodology can decrease the amount of time it takes to perform a segmentation of the second frame as compared to other methods.

Some examples of segmentation methods which can be utilized include but are not limited to thresholding, clustering, compression-based, histogram-based, edge detection, dual clustering, region-growing, partial-differential equation-based, variational, graph partitioning, watershed transformation, model based segmentation, multi-scale segmentation, trainable segmentation and combinations thereof. In thresholding, a clip-level or threshold value is selected to create segmentation boundary. In clustering, an algorithm, such as a K-means algorithm can be applied to partition an image into K-clusters. In addition, neural nets can be applied for segmentation.

In compression-based methods, optimal segmentation can be one that minimizes, over all possible segments, the coding length of the data. In histogram-based methods, a histogram can be computed from all of the pixels in the image, and the peaks and valleys in the histogram can be used to locate the clusters in the image. Color or intensity can be used as the measure. In edge detection, region boundaries and edges can be closely related, since there is often a sharp adjustment in intensity at the region boundaries. Thus, using the intensity, edges can be detected.

In dual clustering, partition of the image based on histogram analysis can be checked by high compactness of the clusters (objects), and high gradients of their borders. Region-growing methods can rely mainly on the assumption that the neighboring pixels within one region have similar values. The common procedure can be to compare one pixel with its neighbors. If a similarity criterion is satisfied, the pixel can be set to belong to the cluster as one or more of its neighbors.

Using a partial differential equation (PDE)-based method and solving the PDE equation by a numerical scheme, one can segment the image. The central idea is to evolve an initial curve towards the lowest potential of a cost function, where its definition reflects the task to be addressed. The goal of variational methods is to find a segmentation which is optimal with respect to a specific energy functional. The functionals consist of a data fitting term and regularizing terms. Graph partitioning methods are an effective tools for image segmentation since they model the impact of pixel neighborhoods on a given cluster of pixels or pixel, under the assumption of homogeneity in images The watershed transformation considers the gradient magnitude of an image as a topographic surface. The central assumption of model based segmentation approach is that structures of interest/organs have a repetitive form of geometry. Therefore, one can seek for a probabilistic model towards explaining the variation of the shape of the organ and then when segmenting an image impose constraints using this model as prior.

In trainable segmentation, a model can be trained to segment an object. For example, neural network segmentation can rely on processing small areas of an image using an artificial neural network or a set of neural networks. After such processing the decision-making mechanism marks the areas of an image accordingly to the category recognized by the neural network. A type of network designed especially for this is the Kohonen map. In one embodiment, the devices can include special chips dedicated to implementing a neural net.

Returning to FIG. 10, as described above, a skeleton and/or pose detection 1012 can be performed. Detection methods are described above with respect to FIG. 9A. The skeleton detection 1012 can involve detecting key points, such as 1006a, 1006b and 1006c. The skeleton detection 1012 can identify joints, such as shoulder 1009, knee 1015 and elbow 1018. In addition, the skeleton detection 1012 can identify skeleton segments, such as upper leg 1011 and lower arm 1020.

In one embodiment, if depth data is available, 3-D locations of the skeleton joints and segments can be determined. For example, using a dual-camera system, depth data can be generated and the 3-D location of the joints and segments can be determined. The locations can be used to determine a pose of the person.

In another embodiment, a library of 3-D poses can be projected into 2-D. Then, the 2-D projections of the 3-D poses can be compared to a current 2-D pose of the person as determined via the skeleton detection. In one embodiment, the current 2-D pose can be determined via the application of a neural network to a frame of 2-D image data. Next, when a 2-D projection of a 3-D pose is matched with the current 2-D pose determined from the image data 1008, the current 2-D pose can be assumed to have similar attributes as the 3-D pose. In one embodiment, this approach can be used to estimate a depth for each joint or a relative distance between the depths for each joint.

The location and/or depth information for each joint can be used to determine locations in the frame to render an effect. For example, location 1025 is at intersection between the segment 1027 joining the shoulder joints and a spine segment 1024. The location 1025 can be selected as a location to render an effect, such as wings sprouting from the persons back. The wing effect can be rendered as if the wings are attached at this location to the person's body.

In addition, as described above, the length of a segment can be used to size an effect in a frame. In this example, the length can be a pixel length. For example, the pixel length of the spine segment 1024 can be used to size the wings which are anchored to the person as described in the previous paragraph.

As a person moves or a camera moves, location 1025 can move in each of the frames. Thus, rendered appearance of the effect can depend on the determination of this location in any of frames images. For example, a series of frames in a video stream can show a person going from a standing position to a sitting position where a wing effect is rendered on the person. As the person moves through the different skeleton poses involved in going from standing to sitting, location 1025, determined in each image can change. The wing effect can follow the positional changes in location 1025. Hence, it can appear as if a person with wings is going from a standing to a sitting position.

In another example, an effect can be anchored to a person's hand. For instance, a sword or a wand can be anchored to a person's and drawn extending from the person's hand. The person's hand can be move from frame to frame. As the person's hand moves, the position of the effect, such as a sword, anchored to the person's hand, can move from frame to frame.

In general, the location of skeleton joints and segments joining skeleton joints can be used as locations for rendering one or more effects associated with body. For example, a first effect can be rendered using a location of a shoulder joint in an image where as a second effect can be rendered using a location of the knee 1015. In another example, a third effect can be rendered along leg 1011.

In yet another example, a fourth effect might be associated with spine segment 1024. The fourth effect can be positioned as ½ or ⅓ the distance along the length of this segment, such as ½ or ⅓ the distance from location 1025.

In some embodiments, it can be desirable to identify a ground plane associated with an image, such as ground plane 1022. The ground plane can be useful when orientating image effects associated with the detected skeleton. For example, it can be desirable to augment the skeleton with an effect that is parallel to the ground plane. In other embodiments, the effect can rendered at some other orientation relative to the ground plane 1022.

In various embodiments, the gravity vector from the IMU can be used to get the estimated orientation of the ground plane. In addition, the location of the ground plane can also be based on the detected skeleton. For example, the spine segment 1024 of the standing person can be used to estimate the ground plane, i.e., the ground plane is approximately perpendicular to the torso segment. In another embodiment, the IMU ground plane estimation and tracked key points can be used to estimate the location of the ground plane.

With reference to FIG. 11, shown is a particular example of a diagram illustrating the replacement of body parts detected in an image of a person. In particular, FIG. 11 includes an outline of a person at 1102, which represents an abstraction that may be drawn from a video frame or static image. In one embodiment, the outline of the person can be obtained using image segmentation.

For instance, a skeleton detection or tracking algorithm may estimate the location of a person's body parts to determine a pose. After skeleton detection and/or tracking is performed, one or more of the person's body parts may be replaced with an alternative body part to make the person appear physically different while exhibiting the same or similar pose. For instance, in the example shown in FIG. 11 the person's corresponding body parts may be replaced with a panda head 1104, a panda body 1106, a panda upper arm 1108, and a panda lower arm 1110.

According to various embodiments, a potentially infinite variety of filters or modifications may be applied to digital media content in response to skeleton detection. A number of examples are provided as follows. The examples can involve modifying a portion of the person and/or the background surrounding a person. As will be described in more detail below, the background surrounding a person can be detected, modified and/or replaced. The modifications can take place in real-time based upon a video stream which is being received and/or associated with an MVIDMR which is generated from a video stream.

When a person is detected with arms outstretched, visual elements such as angel wings, bat wings, butterfly wings, plane wings and engines, or a jetpack with exhaust fumes may be added. When a person is detected in a leaning posture, visual elements such as a dinosaur tail, a squirrel tail, or a raccoon tail may be added. When a person is detecting standing with hands on hips, visual elements may be added to replace the person's clothing with a superhero costume or to add a cape to the person's existing attire.

When a person is detected as yelling, for instance with hands cupped around the mouth, visual elements may be added to depict a megaphone, flames, or a speech bubble near the person's mouth. Depending on a person's pose, visual elements may be added to replace a person's clothing or depict a person's body as a skeleton. When a person is detected as standing in a body builder's pose, the person's body may be replaced with one exhibiting more muscles or deformed to appear to exhibit more muscles. When a person is detected as having a hand over a mouth, visual elements may be added to make the person appear to be underwater as a scuba diver or mermaid. When a person is detected as leaning forward in a flying position, visual elements may be added to make the person appear to be a flying angel or super hero. For instance, a person's legs may be moved to make the person appear to be not supported by the ground.

When a person is detected with arms uplifted, visual elements may be added to cause rainbows, money, or angels to appear over the person. When a person is detected with hands arranged in a boxing pose, visual elements may be added to make the person appear to be wearing boxing gloves or holding a weapon. A person's facial features or body may be modified to make the person appear to have the head or body of an animal, a fruit, a robot, or some other such object.

A person's facial features may be detected and then used to select a corresponding emoticon, which then may be used to replace the person's head. When a person is detected as walking a dog, the dog's head and the person's head may be swapped. A person may be made to appear much thinner, heavier, more muscular, less muscular, or wavier than in reality. Motion blur may be added to make a person appear to be spinning very quickly. The preceding examples provide additional context about the types of visual modifications that could be made, but a potentially large variety of visual modifications may be provided according to various embodiments, and these are provided for the purposes of illustration only.

Body Segmentation and Background Effects

Figure 12:
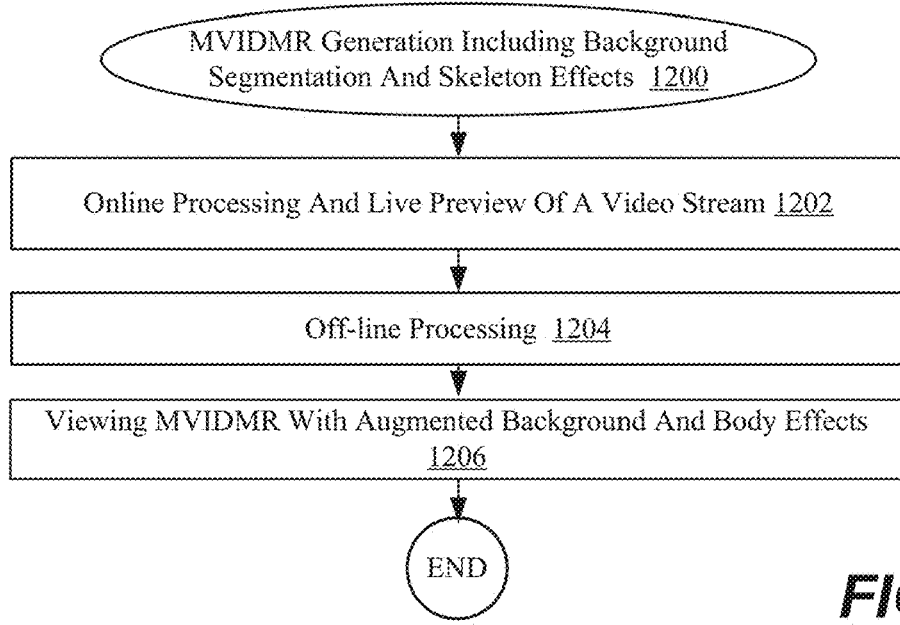
FIG. 12 is a block diagram of a method of MVIDMR generation including background segmentation and skeleton effects in accordance with embodiments of the present invention.

FIG. 12 is a block diagram of a method 1200 of MVIDMR generation including background segmentation and skeleton effects. In step 1202, a user can point a mobile device at a person (or another object) to capture image data. One or more frames of the image data can be analyzed to determine whether a person or some other object is present.

When a person or other object is detected, some initial segmentation can be performed. The initial segmentation can separate out the person from the background. Then, an augmented image can be generated where the real background (area in image surround the person) is replaced with a virtual scene and a visual effect to the person is added to the person and/or another object in the image. The effects can be attachments to the person, elements that cover portions (or all) of the body of the person (e.g., a spacesuit), or loosely attached effects (e.g. speech bubbles) (see e.g., FIG. 11). In one embodiment, a skeleton of a person determined via a skeleton detection routine (see, e.g., FIGS. 9A-11) can be used to anchor the effects to a person and provide a basis for replacing a portion of a person's body with an effect.

During the preview stage the user can preview the effect live in the camera and as soon as the user decides to take a recording, the method can start saving various sensor data (e.g. camera images, IMU data, data derived from the visual camera stream, etc.) to method for later offline processing and viewing. Thus, the preview may only show a portion of an effect. In addition, during a preview stage, the effect can have less detail or a lower resolution than when the effect is rendered at a later stage, such as after off-line processing. An example of a preview and a previewing system is described below with respect to FIGS. 13 and 15.

For example, the background can be shown removed around a person. However, the background may not be filled in with another image. As another example, the segmentation of the outline of a person or an object can be refined with off-line processing. Thus, the edges around the person can initially rough in the pre-view stage as compared to after off-line processing is performed.

In 1204, during off-line processing, data recorded during the live preview stage can be further processed to provide more refined effects. Further, an MVIDMR can be generated which includes effects added to a person and an augmented background. The MVIDMR can be configured to allow these effects to be viewed from many different viewing angles. For example, when wings are attached to a person, the MVIDMR can allow the person and the wings to be viewed from different viewing angles. Thus, the rendering of the wings can change from frame to frame in the MVIDMR. Further examples of off-line processing are described below with respect to FIG. 16.

When the different viewing angles are considered, the rendering of an effect can consider depth, i.e., the rendering can be done from a 3-D dimensional model of the effect. Further, whether the effect is occluded or not by different objects, including the effect itself, can be considered during the rendering. The occlusion effects can vary depending on the viewing angle.

For example, the wings can be rendered as being anchored to a back of a person starting at the spine. When directly facing the person from the front, the body of the person can block a portion of the wings that are visible. If the view is rotated one hundred eighty degrees, the wings may be fully visible but a portion of the person's body can be blocked by the wing. When viewed from the side, a portion of the wings may block a view of another portion of the wings.

The determination of occlusions can be performed using depth ordering. Depth ordering can refer to assign a depth value to different pixel locations. Based on the depth ordering, a determination can be made as whether one object is in front of another object. For example, a depth value can be assigned to a body. Then, relative depth values can be assigned to an effect, such as wing, based upon a 3-D model of the wing and the location where the effect is attached to the body.

As the camera view is changed, geometric considerations, such as the orientation of the camera obtained from IMU data, can be used to determine new depth values. In various embodiments, depth data to perform depth ordering can be obtained using information, such as but not limited to, depth data obtained from using multiple cameras, key point tracking, 3-D modeling when effects are rendered and object modeling.

Object modeling can rely on models of objects identified in an image to estimate depths. For example, based upon a skeleton detection in a 2-D frame from a video stream, a pose of a person can be determined. The determined pose can be matched to a 3-D model of a person, i.e., a 3-D model which when rendered to 2-D provides similar results as detected in the image. The 3-D model of the person can then be used to estimate relative depths associated with the body in the pose.

In another embodiment, skeletons can be detected in multiple frames, such as adjacent frames in a sequence of images. The 2-D skeletons detected from the multiple frames can be used to perform a 3-D reconstruction of the skeleton. Then, the 3-D reconstruction can be used to infer depth in the image. The inference of depth can involve identifying common points in the images, such as joints on the skeleton, and then performing a triangulation calculation in a 3-D space to infer a depth.

As another example, a car can be identified in a 2-D frame. Then, the view of the car in the image can be matched to a 3-D model with an orientation that, when projected to a 2-D frame, provides a similar shape as identified in the 2-D frame. Based upon the 3-D model of the car, depth ordering can be estimated for the pixels in the 2-D frame.

Next, in 1206, after off-line processing in 1204, an MVIDMR with augmented background and body effects can be viewed. In one embodiment, the MVIDMR can incorporate the transformation into the viewing experience. For example, as an object, such as a person is viewed from different angles, the background can be shown being removed and the effects added to the person can be shown being added in different stages. An example of this format is shown and described in FIG. 14 and a viewing system is described in FIG. 17.

During the on-line processing stage 1202, a series of video frames can be received. In one embodiment, during the on-line processing stage, the detection methodologies, such as skeleton detection and body segmentation, can generally be performed on a frame by frame basis. Thus, the detection of the skeleton locations and body segmentation locations in a single frame can be performed based upon information received from only the single frame. Thus, information about skeleton locations and body segmentation determined from nearby frames in the series of video frames may not be used to determine the skeleton location and body segmentation locations. When adjacent frame affects are not considered, the processing steps can be reduced which can help to enable a real-time presentation, such as a real-time presentation of a frame augmented with a selected effect in a preview while image data for an MVIDMR is being captured. This process is described in more detail with respect to FIG. 15.

The presentation of an MVIDMR can involve outputting a series of related video frames. Large variations from frame to frame in an MVIDMR can result in a perception of motions and other effects that degrade a perceived quality of the MVIDMR. To reduce these effects, the changes from frame to frame can be considered. For example, a skeleton detection method can be applied where information from a single frame of image data and information from adjacent frames of image data are used to determine the skeleton locations in the single frame of image data. The initial skeleton detection where only the single frame of data is used can provide the starting point for this methodology. This process is described in more detail with respect to FIG. 16.

As another example, a body segmentation method can be applied where information from a single frame of image data and information from adjacent frames of image data are both used to determine the segmentation of an object, such as a body, from the background of an image in the single frame. Again, the initial body segmentation where only the single frame of data is used can provide the starting point for this methodology. This process is also described in more detail with respect to FIG. 16.

Thus, a two-step process can be employed for different aspects of generating the MVIDMR. In a first step, single frame analysis can be performed where information from only a single frame is used and information is not propagated between frames. For example, body segmentation from a background can be performed on each frame in a series of frames using only information from each frame. In a second step, multi-frame analysis can be performed where information between frames is propagated and used to determine a result for a particular frame. For example, the body segmentation from the background can be performed on each frame in a series of frames where information about the body segmentation determined for a first frame affects the body segmentation determined for a second frame.

Typically, information from the first step can provide a starting point for the second step, i.e., the single frame analysis is used as a starting point for the multi-frame analysis. For example, the single frame analysis for skeleton detection can be used as the starting point for a multi-frame analysis of skeleton detection, such as the skeleton batch-smoothing described in 1602. In various embodiments, only the first step involving a single frame analysis can be used for some processes whereas a multi-frame analysis can be performed for other processes. For example, the skeleton detection can be performed only using a single frame analysis whereas the body segmentation can be performed using a multi-frame analysis.

Figure 13:
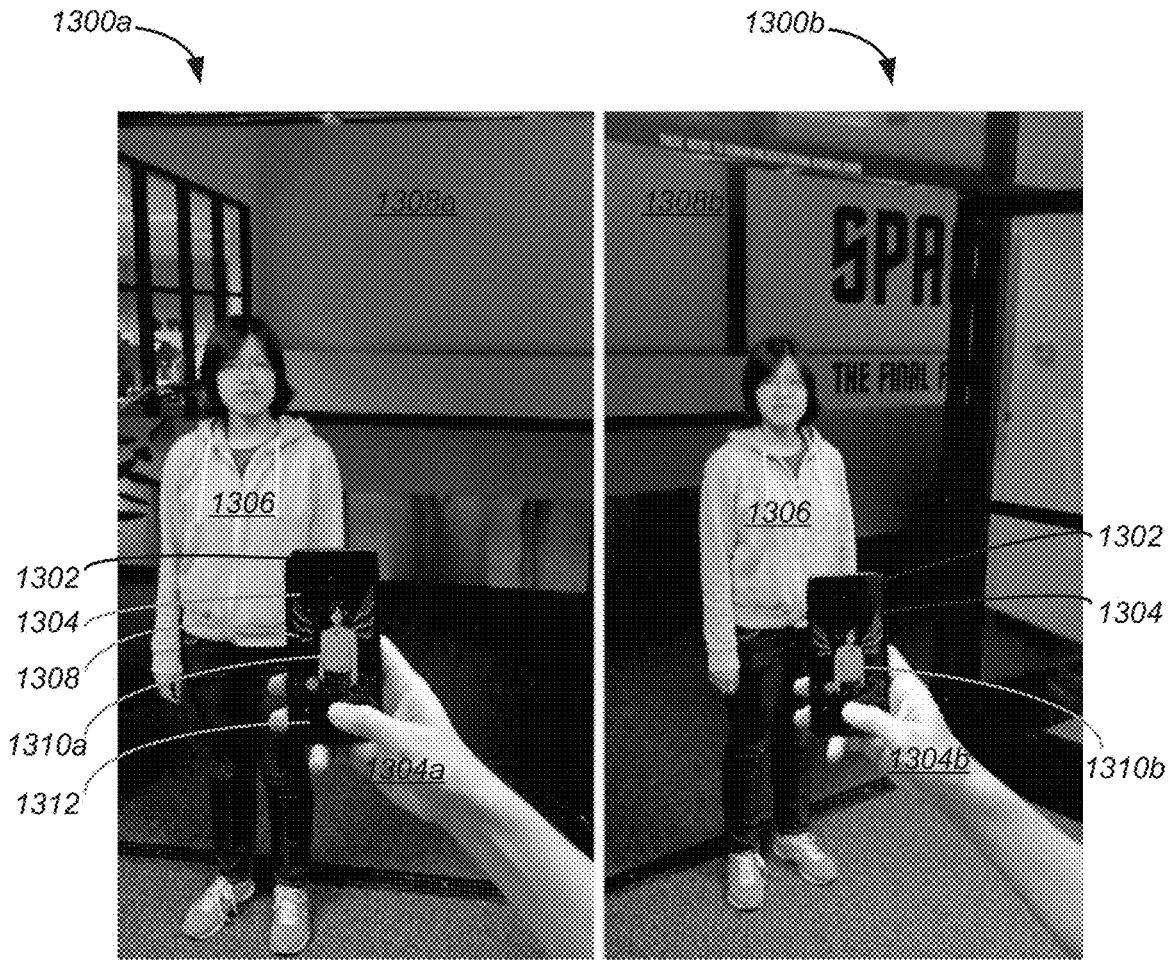
FIG. 13 is an example of previewing an MVIDMR with background augmentation and skeleton effects in accordance with embodiments of the present invention.
Figure 14A:
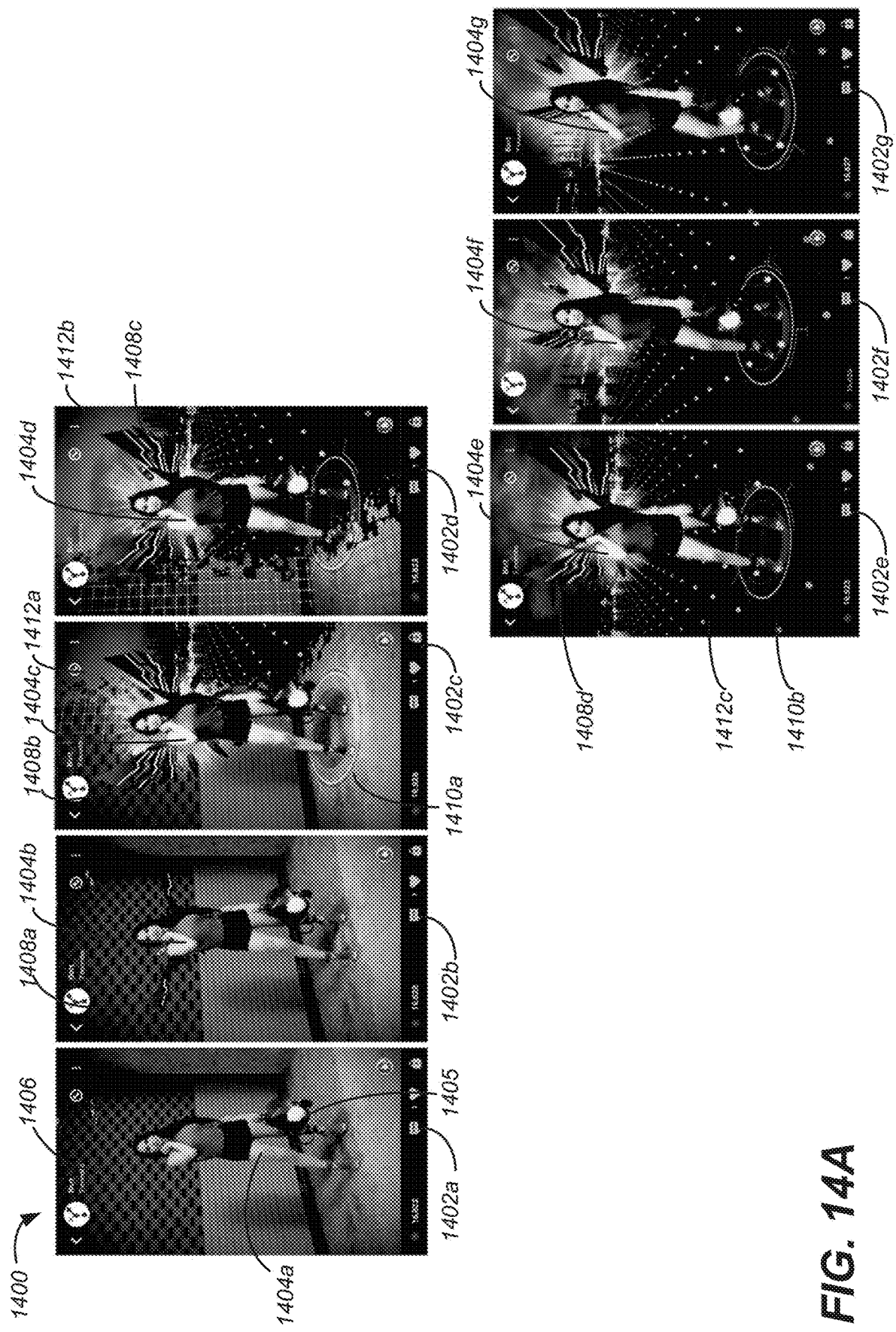
FIG. 14A is a first example of viewing an MVIDMR with background augmentation and skeleton effects where the transformation between the original frame and augmented frame is shown in accordance with embodiments of the present invention.
Figure 14B:
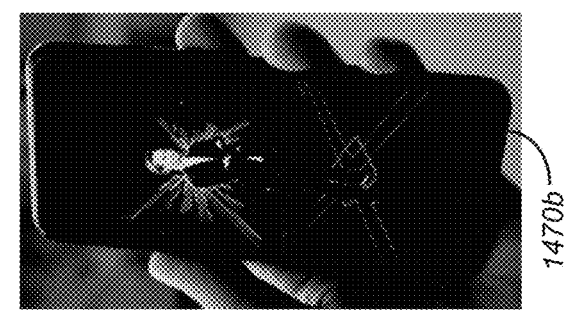
FIG. 14B is a first example of viewing an MVIDMR with background augmentation and skeleton effects where the transformation between the original frame and augmented frame is shown in accordance with embodiments of the present invention.
Figure 14B:
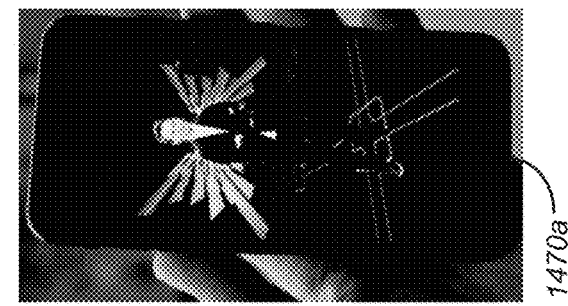
Figure 14B:
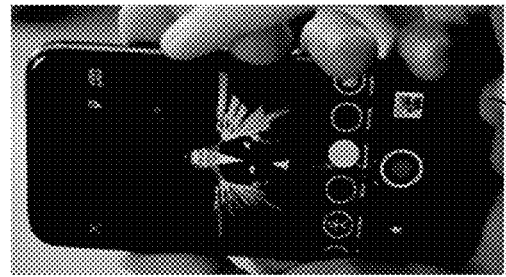
Figure 14B:
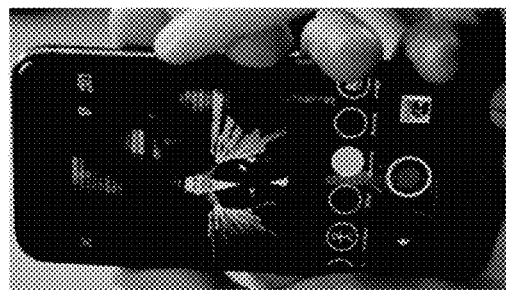
Figure 14B:
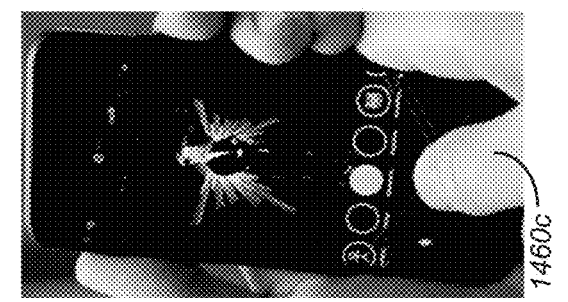
Figure 14B:
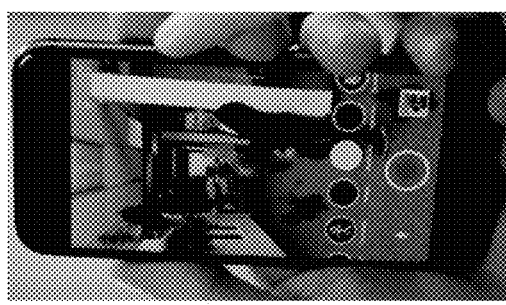
Figure 14B:
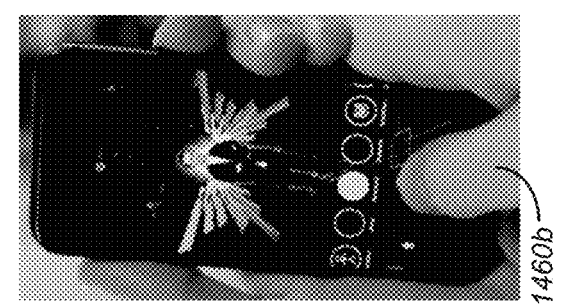
Figure 14B:
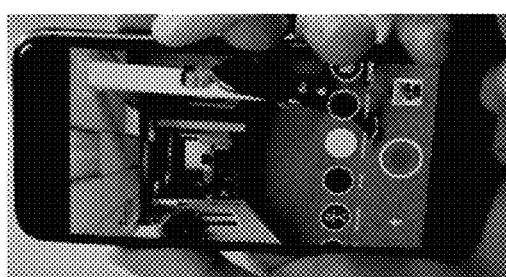
Figure 14B:
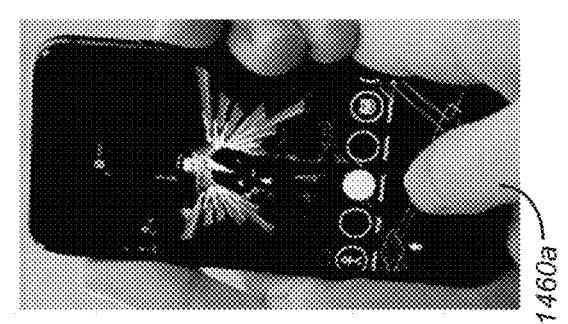
Figure 14B:
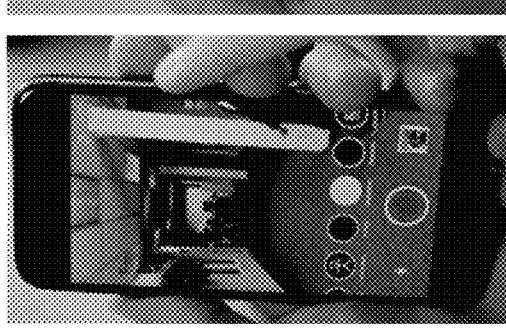

Next, with respect to FIGS. 13, 14A, 14B examples of a preview of an MVIDMR and an MVIDMR after additional processing, which includes object segmentation, such as body segmentation, object effects and background substitution are described. FIG. 13 is an example of previewing an MVIDMR with background augmentation and skeleton effects. The skeleton effects involve anchoring an effect to person's body or replacing a portion of the person's body in an image.

In 1300*a*, a person 1306 is shown standing against a background 1308*a*. A hand 1304*a* associated with a second person is holding a mobile device 1302 with a display 1304. A view 1310*a* of the person 1306 is shown on the display. In the preview, a wing effect 1308 has been generated around the person 1306. Further, some initial segmentation has been performed. The initial segmentation allows the pixels associated with the view 1310*a* of the person 1306 to be separated from the background pixels in the image. The background pixels 1312 have been replaced with a new background which is darker than the background 1308*a* which actually surrounds the person.

During the preview process and while image data is being captured for an MVIDMR, the position of the camera and/or the person can change. For example, the person can spin around in place or the camera can move around the person. Thus, the view of the person in the image data can change.

In 1300*b*, the person 1306 and background 1308*b* is shown from a different view as compared to 1300*a*. In 1300*b*, the position of the camera 1302 has been moved relative to the person 1306. Thus, a different view 1310*b* of the person 1306 is shown on display 1304. Nevertheless, a preview of the wing effect and the new background is still shown on the display.

After the initial sensor data is captured, additional processing can be performed. As described above with respect to FIG. 10, a sensor package including but not limited to one or more cameras and an IMU can be used to capture data about an object, such as person. This initial sensor data, which includes image data, can be post-processed to generate an MVIDMR. In particular, an MVIDMR including an effect selected by a user, such as the wings in FIG. 13.

In various embodiments, one or more object can be identified and a segmentation can be done which denotes a boundary between or boundaries between the one or more objects and the background. In one embodiment, an effect can be rendered on the object where the effect doesn't extend into to the background and the background remains unmodified. In yet other embodiments, the original background can be replaced with a new background.

In another embodiment, an effect can be added to the background that doesn't extend onto to the object. For example, an additional object can be added to the background. The background can be an original background or a replacement to the original background.

In yet another embodiment, one or more effect can be rendered onto a body where the effect extends into the background. For example, wings can be anchored to a body, which then extend into the background. The background can be an original background or a replacement background. As another example, wings can be anchored to a body and then a second object can be rendered as extending from the hands associated with the body.

FIG. 14A is an example of viewing an MVIDMR 1400 with background augmentation and body effects anchored to a skeleton. In FIG. 14A, a series of images, 1402*a*, 1402*b*, 1402*c*, 1402*d*, 1402*e*, 1402*f* and 1402*g* used in an MVIDMR are shown. The images can be output to a display, such as a display on a mobile device, a tablet computer or a personal computer. The images can be generated after a preview process as described above with respect to FIG. 14A during which the image data used to generate the MVIDMR was captured.

Each of the images include an image of a person from a different viewing angle, 1404*a*, 1404*b*, 1404*c*, 1404*d*, 1404*e*, 1404*f* and 1404*g*, respectively. The person is shown holding an object in the MVIDMR 1440. In this example, the object is preserved, i.e., it is not segmented from the person and is also shown from different angles.

In the progression of images associated with the MVIDMR 1400, a transformation process is shown. In 1402*a*, the person 1404*a*, the original background 1406 and the object is shown. In the next image 1402*b*, an effect 1408*a* has been added to the person. In this example, wings have been added. Skeleton detection can have been performed and the wings can be anchored to a line going through the person's spine. Body segmentation can have been performed. Using this information, in this embodiment, the wings don't occlude any portion of the body and extend into the background surrounding the person 1404*b*. In some embodiments, effects can be rendered which do occlude body parts. For example, a view from the back of the person 1404*b* can show the wings sprouting from the back of the person and covering a portion of the person's back.

In the next image 1402*c*, a portion of the original background 1406 is now replaced with a new background 1412*a*. The background includes a futuristic city scape. Other backgrounds are possible and this example is provided for illustrative purposes only. In particular, using the body segmentation and skeleton detection which has already been performed, a user can select to different body effects and backgrounds to implement in the MVIDMR.

In addition, in 1408*b*, the wing effect has been extended. It is larger than compared to image 1402*b*. Further, a portion of the wing effect is rendered over the original background 1406 and a portion of the wing effect is rendered over the new background 1412*a*.

Yet further, in 1402*c*, a pedestal 1410*a* is shown. The pedestal 1410*a* can be associated with the background effect. The pedestal provides an indication of the ground plane. In 1402*c*, the pedestal is rendered over the original background 1406 in image 1402*a*.

In other embodiments, additional objects can be rendered relative to the person. For example, one effect can involve rendering objects that are strewn around person's feet. Thus, the effect can involve determining a location, such as a location of body part on a person, and then rendering one or more objects relative to the location. In this example, the effect is not anchored directly to the location but is anchored relative to the location.

In 1402*c*, the pedestal 1410*a* is drawn approximately parallel to the floor. As described above with respect to FIG. 10, the IMU data can be used to estimate the ground plane and hence a plane in which to draw the pedestal. The pedestal is placed near the person's feet. The person's feet and hence the location of the floor can be determined using skeleton detection (again, see FIGS. 9, 10 and 11). Thus, the pedestal placement location in the image can be determined from both the IMU data and the skeleton detection.

Further, the pedestal 1410*a* doesn't occlude the person. The pedestal is shown drawn such that it appears to goes behind the person's legs. The location of the person's legs in the image can be determined from the skeleton detection and the body segmentation which can be performed on the image data. In general, the body segmentation can be used to render effects which appear to go behind a person, such as a pedestal that goes behind a person, a background (e.g., the city) or an effect (e.g., the wings).

In 1402*d*, the background 1412*b* covers a larger area as compared to image 1402*c*. However, a portion of the original background 1406 still remains. In 1404*e*, the original background 1406 is totally replaced with the new background 1412*c*. The new background is also shown in images 1402*f* and 1402*g*.

The wing effect 1408*c* is complete in size. The orientation of the wing effect is slightly changed between the images 1402*c* and 1402*d* as the orientation of the person has changed. As is shown in images 1404*e*, 1404*f* and 1404*g*, the orientation of the wings changes as the orientation in the person changes in the images.

In one embodiment, a second viewing option can be provided. In the second viewing option, the transformation from the original image to the final images is not shown. Instead, the person can be viewed against the new background, with the pedestal in place and the wings attached and fully rendered from all the viewing angles. Thus, for example, images 1402a, 1402b, 1402c and 1402d can be shown with the new background 1412c as shown in image 1402e, the pedestal 1410b as shown in image 1402e and the wing effect 1408d as shown in image 1402e.

In this fully transformed mode, in images 1402a, 1402b, 1402c and 1402d, the background, pedestal and wings can be adjusted to account for the different orientation of the person in the images. For example, the pedestal can be rendered differently to account the different position of the person's legs in each of the images. Further, the wings can be rendered differently to account for the different body orientation of the person. Yet further, the background can be differently to account for the different boundary between the person and the background which changes depending on the orientation of the person.

With respect to FIG. 14B, a series of images displayed on a mobile device are described. In a first series of images, 1452a, 1452b, 1452c, 1452d and 1452e, a preview stage is described. A person walks into a camera view. An effect, wings, can be selected. As the person walks into the view skeleton detection and segmentation begin to happen. In 1452a, the background starts being replaced near the lamp at the end of the hallway and continues into 1452b.

In 1452c, the background starts being replaced at additional locations. The locations are non-contiguous. In addition, an effect, which is wings, starts being drawn in the image. In 1452d, a person is near the middle of the image. The background in nearly completely replaced and the wing effect is more fully rendered. In 1452e, the background is completely replaced and the wing effect remains. The person's position is slightly shifted as compared to image 1452d.

In frames 1460a, 1460b and 1460c, the person remains relative stationary. However, the camera is now moved clockwise around the person. As the camera is moved video frames are being recorded that can be used to generate an MVIDMR. During recording, the effects around the person including the new background and wings can be maintained. Thus, skeleton detection and background can be on-going. The preview process including image recording is described in more detail with respect to FIG. 15.

After capturing a video stream including a plurality of video frames, a portion of the video frames can be selected to generate an MVIDMR. The MVIDMR can include the selected effects including the replaced background and wings. The MVIDMR generation can involve additional processing on the selected images where information is propagated between frames, i.e., as described above a multi-frame analysis can be performed. The information can be propagated between frames to reduce the magnitude of changes that occur between frames in the MVIDMR. The information propagation between frames can result in a smoother viewing experience of the MVIDMR. The multi-frame analysis is described in more detail with respect to FIG. 16.

An MVIDMR is shown in images 1470a and 1470b. A user tilts the mobile device to view the MVIDMR from different angles. The final MVIDMR includes both the background replaced and effects of the wings which are anchored to the person's skeleton. The viewing of an MVIDMR after the additional processing steps is described with respect to FIG. 17.

The background images and the wings are rendered to account for the changes of the person in the images as a result of the changing position of the camera. In particular, different views of both the background and the wings are rendered into the images as the orientation of the camera and hence the person changes in the images.

Figure 14C:
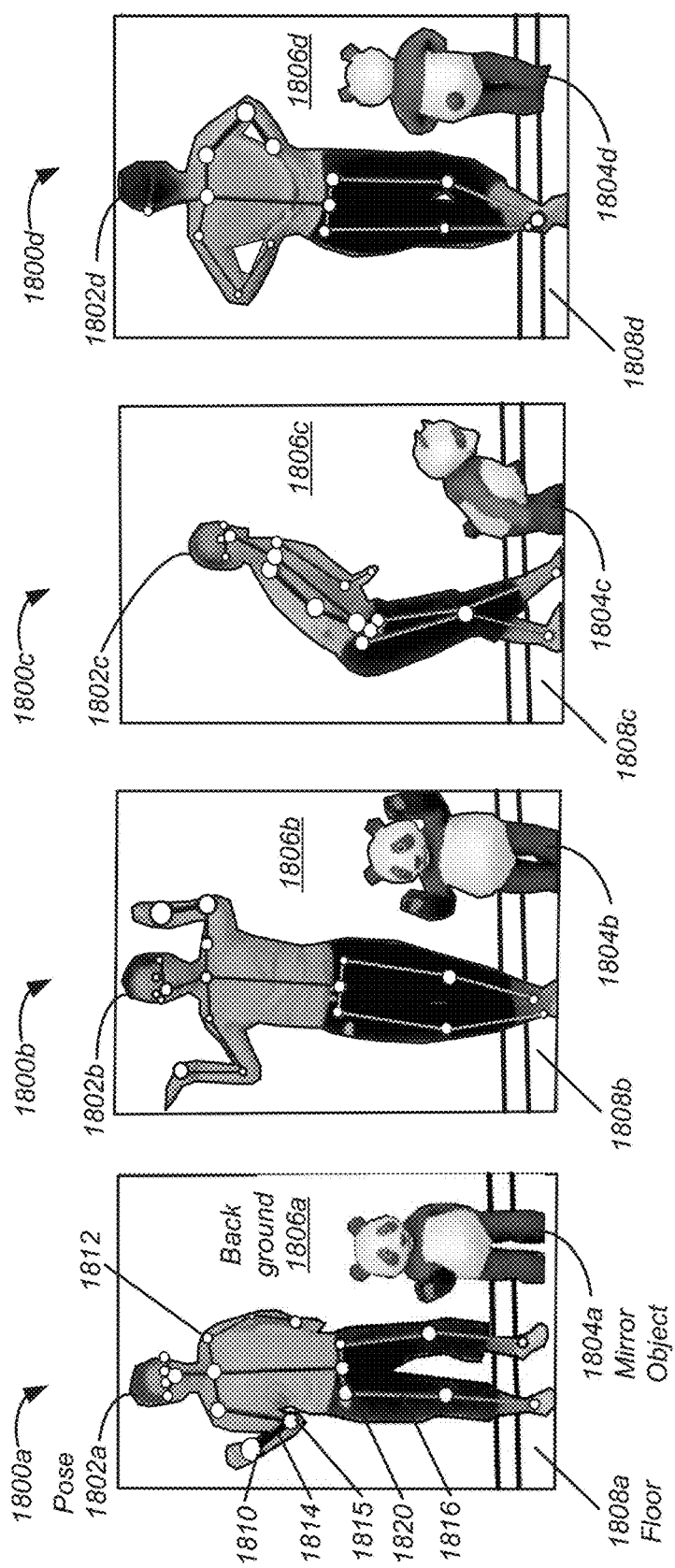
FIG. 14C is an example of object mirroring which can be used in a preview stage of an MVIDMR and/or incorporated into an MVIDMR in accordance with embodiments of the present invention.

Next, with respect to FIG. 14C, additional embodiment of utilizing skeleton detection in image frames are described. In FIG. 14C, four frames 1800a, 1800b, 1800c and 1800d, from a sequence of frames are shown. Each of the frames include includes a person in various poses 1802a, 1802b, 1802c and 1802d. As an example, this sequence of poses could be recorded while the person is dancing in front of the camera. As described above, a 3-D reconstruction of the pose can be determined from the 2-D image frames.

In the poses, 1802a, 1802b, 1802c, 1802d, the person's limbs and body position are changing relative to the camera. For example, in frames 1800a and 1800b, the person is facing the camera. Whereas, in frame 1800c, the person is turned sideways relative to the camera. In frame 1800d, the person's back is facing the camera. In frames, 1800a, 1800c and 1800d, the person's arms mostly down. Whereas, in frame 1800b, the person's arms are raised. In frames, 1800a, 1800b and 1800d, the person is standing up relatively straight. Whereas, in frame 1800c, the person is shown bent over.

The person in each of the frames is moving along the floor. The person can be moving towards and away from the camera as well as to the left or right of the camera. A different portion of the floor 1808a, 1808b, 1808c and 1808d, is captured in each frame. The different portion of the floor can be captured because the person can be moving along the floor and the position of the camera can be changing to capture the person's position and keep the person in the frame. When the camera is far enough away from the person, then the camera, such as a handheld mobile device, can be held in a relatively constant orientation.

The person in each frame 1800a, 1800b, 1800c and 1800d, can be moving against a background. In this example, the background can be a wall. Like the floor, a different portion of the background 1806a, 1806b, 1806c and 1806d, can appear in each frame as the person moves and optionally the position of the camera changes to capture the person's position.

A skeleton detection has been performed on the person 1802a, 1802b, 1802c and 1802d in each 2-D image frame. The skeleton detection can include a determination, based upon the pixel data associated with the frame, of the location of joints or body parts. For example, wrist 1810 and shoulder 1812 are identified in frame 1800a as circles. In addition, other locations, such as eyes, ears, nose, neck, elbows, hips, knees and ankles are also identified by circles in the frames.

The circles representing adjacent body locations can be connected according to a predefined mapping. The mapping can represent a skeleton. For example, a line can be drawn between the wrist 1810 and the elbow 1815. The line can represent the bones connecting the wrist and the elbow.

In one embodiment, the joint locations and lines connecting the joints determined for a frame, such as 1800a, 1800b, 1800c and 1800d, can be rendered into the frame. For example, a camera on a mobile device can capture an image frame, a skeleton detection can be performed on the image frame, and then, the joint/body part locations and lines connecting the joints and body parts can be rendered into the image frame to generate an augmented frame. Then, the augmented frame can be output to display on the mobile device.

These operations can be performed contemporaneously such that the augmented frames are representative of what is being captured by the camera in a preview stage. In the preview stage, frames can be displayed without being recorded or can be recorded. In one embodiment, the skeleton detection and frame augmentation including the skeleton detection can be done at the same rate as the frames are being natively output to the display, such as at thirty frames per second. In another embodiment, the skeleton detection and frame augmentation including the skeleton detection can be performed at lower resolution than native resolution, such as at fifteen frames per second.

As described above, a 3-D reconstruction can be performed to determine depth information associated with the skeleton, such as a 3-D pose. In one embodiment, the skeleton, which is rendered into the frames, such as 1800*a*, 1800*b*, 1800*c* and 1800*d*, can be formatted to represent depth information. For example, a size of the circle can represent whether the joint or body location is closer or farther away from the camera. In frame 1800*a*, the circle at wrist joint 1810 is larger than the circle at shoulder joint 1812. The larger size of the circle at wrist joint 1810 is used to indicate it is closer to the camera.

In another example, a thickness of the line joining to two joints or body locations can be used to convey depth information. For instance, the line 1814 is thicker than the line 1816. The thickness of the line 1814 is used to convey that the arm location between the wrist location 1810 and the elbow 1815 is closer to the camera than the body parts between the hip and knee as conveyed by line 1816.

In alternate embodiments, the circles used to convey the joints and body locations can be the same size and the lines joining the joints and body locations can be the same thickness. Thus, depth information may not be conveyed via the size of the circles and the thickness of the lines. In yet other embodiments, the circles and lines which show the skeleton may not be used to augment the frames. In another embodiment, only a partial skeleton may be rendered into a frame to augment a frame. For example, only the joint locations and their connections associated with one arm or both arms can be rendered into a frame. Or, only the joint locations and their connections associated with one leg or both legs can be rendered into a frame.

In another embodiment, the skeleton information detected from the poses 1802*a*, 1802*b*, 1802*c* and 1802*d* of the person can be used to render one or mirror objects which convey the skeleton information detected for the person. The mirror object can be rendered into the frame at a location which is relative to a position the person or object for which a skeleton detection has been performed. For example, the skeleton rendered over the person in the frames can be rendered adjacent to the person. The skeleton can be shown at full size or a reduced size.

In another embodiment, the skeleton information can be projected onto a mirror object which takes a different form than the person. For example, in frames 1800*a*, 1800*b*, 1800*c* and 1800*d*, the mirror object is a panda. The panda or other mirror object can have a different skeleton structure than the person. For example, the panda can have different length limbs and body proportions than the person. The different skeleton structure of the panda can be configured to mirror the pose of the person determined from the skeleton detection on the person. Then, the panda can be rendered into the frame including the person.

The panda is shown taking on various poses 1804*a*, 1804*b*, 1804*c* and 1804*d*, which mirror some of the skeleton information of the person. Thus, in frame 1800*a*, like the person, one of the panda's hands is raised and one is down. In frame 1800*b*, both the person's and the panda's hands are raised. In 1800*c*, the person and the panda are turned to the side, bent over, with arms lowered and a leg extended. In 1800*d*, the person and the panda are turned away from the camera with their hands behind their back. In a series of frames, a series of movements, such as a dance, performed by the person can be captured and the mirror object can be rendered so that it appears to mirror the dance of the person.

To render the panda into frames, a plane can be selected. For example, a ground plane for the person can be determined in the frame, such as the floor. Then, the panda can be rendered onto the ground plane at a position and orientation relative to the person, such as at a pixel distance, from the person.

The skeleton detection for person can provide a first position that is used to determine a position of the mirror object, such as the panda. For example, location 1820 on the skeleton can be projected onto the ground plane associated with the floor 1808*a*. Then, the mirror object 1804*a* can be positioned at a distance and angle relative to this position. In the 1800*a*, 1800*b*, 1800*c* and 1800*d*, the mirror object 1804*a*, 1804*b*, 1804*c* and 1804*d* is to the right of the person. In alternate embodiments, the mirror object can be positioned at other angles, such as to the left, behind the person, in front of the person, etc. In some embodiments, the ground plane can be determined using IMU data (e.g., see FIGS. 7, 8A and 8B).

In addition, a plurality of mirror objects can be used and positioned relative to the person. For example, a first mirror object, such as a first panda, can be positioned and rendered into the frames to the right of the person and a second mirror object, such as a second panda, can be positioned into the frames to left of the person. In another embodiment, the plurality of mirror objects can be the same of different. For example, the first mirror object can be a panda whereas a second mirror object can be a rabbit.

In yet other embodiments, the mirror object doesn't have to be positioned on the plane on which the person is moving. For example, the panda can be positioned so that it appears to be moving in the air in plane above the floor, which is parallel to the floor. In another example, the plane on which the mirror object is rendered can be angled relative to the ground plane. When a plurality of mirror objects are used, the mirror objects can be rendered on the same or different planes. For example, a first mirror object can be rendered on a ground plane on which the person is moving and a second mirror object can be rendered on a plane above the ground plane.

In various embodiments, a selection can be received of a form of a mirror object to use, such as a panda, a skeleton, a rabbit or some other animated character. The selected form can then be rendered into a preview stage. In addition, a selection of a number of mirror objects to be used, such one, two, three, etc. and forms for each selection, can be received. Further, a selection of a position of each mirror object relative to the person can be selected, such as to the right, left, in front, behind, etc., can be received. Also, a selection of a plane on which to render a movement of the person can be selected.

In the preview stage, as described above, a determination of the body segmentation can be used to replace a background surrounding the person. This process can be done gradually as shown in FIG. 14B. In particular embodiments, a selection of a background to use can be received. In addition, as described above, effects can be added to the person, which are anchored to the person's body.

As is described in more detail below, frames of the person moving can be recorded, smoothing can be applied to the frames, such as image stabilization and a higher fidelity of skeleton detection can be performed. The higher fidelity of skeleton detection can be used to re-render the mirror object in the smoothed frames. In one embodiment to reduce processing time, the mirror object rendered in the preview stage can be rendered at a lower resolution with less than detail than after subsequent smoothing is employed.

In particular embodiments, after the additional processing, such as smoothing, an MVIDMR can be generated. The MVIDMR can include the person and the one or more mirror objects together. Alternatively, the one or more mirror objects alone with the person removed. When the person is included, the person can be modified in some way, such as an effect anchored to their body or their body modified in some way. In addition, the background associated with the image can be replaced. In general, the application of a mirror object can be combined with any of the other embodiments, such as anchoring an effect to a person or replacing the background described herein.

Figure 15:
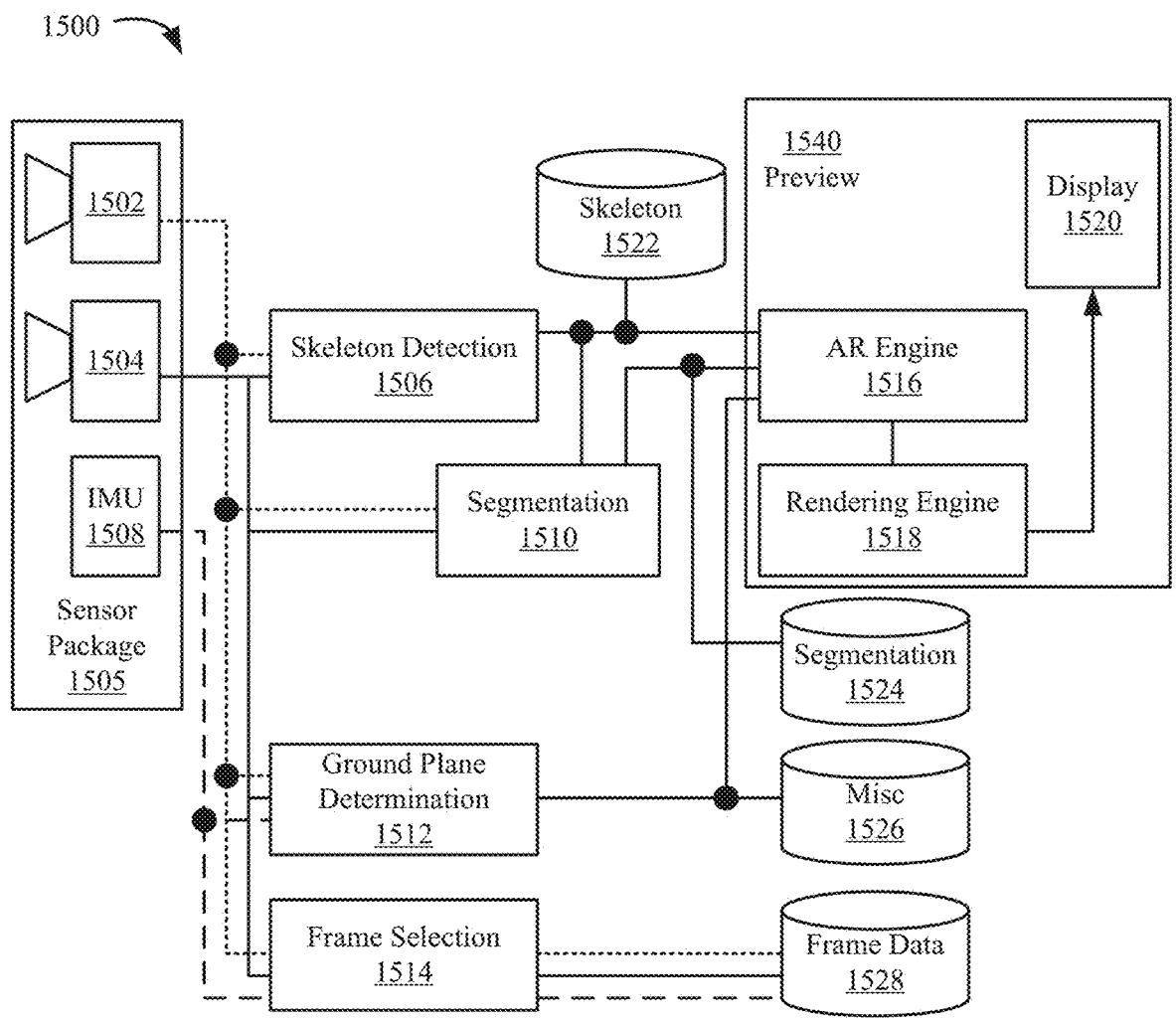
FIG. 15 is a block diagram of system for generating an initial preview of an MVIDMR with background augmentation and skeleton effects in accordance with embodiments of the present invention.
Figure 16:
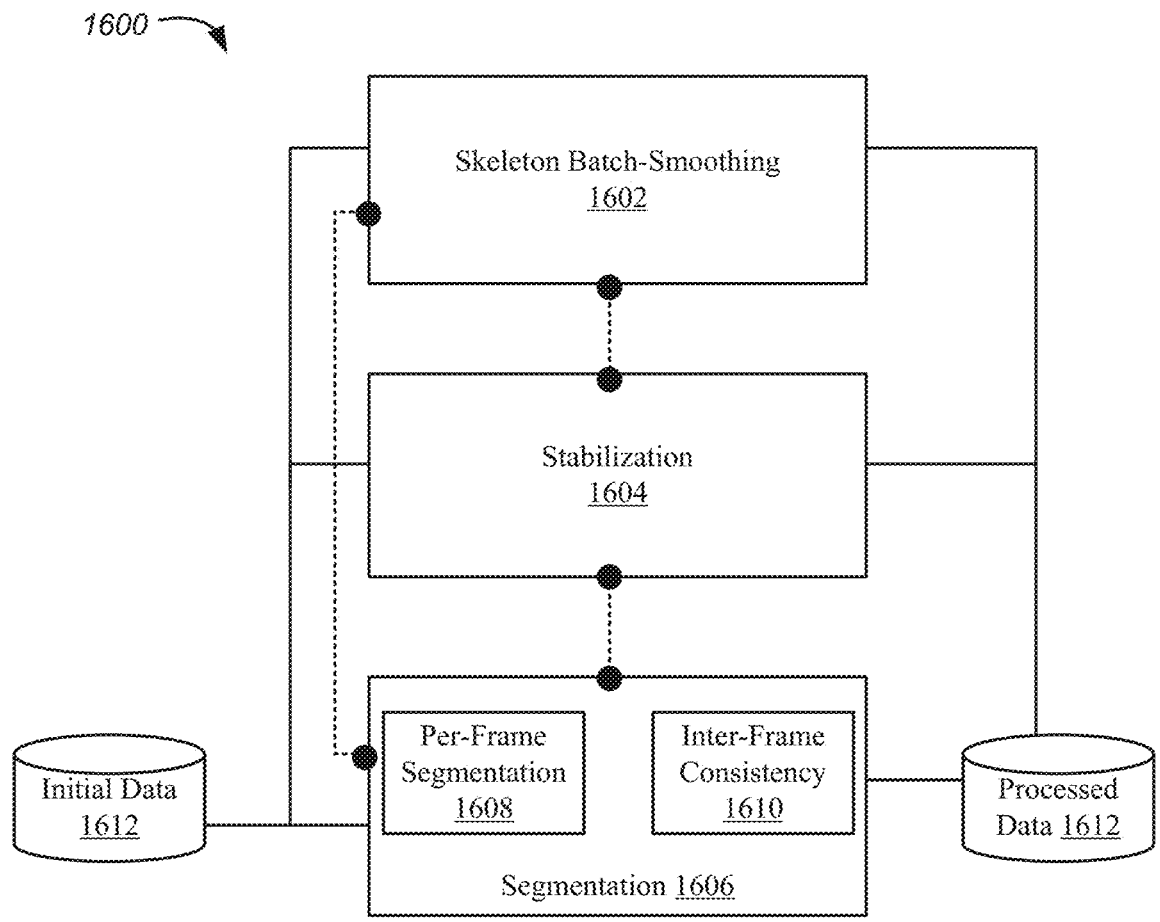
FIGS. 16 and 17 are block diagrams of systems for further processing and viewing of an MVIDMR with background augmentation and skeleton effects in accordance with embodiments of the present invention
Figure 17:
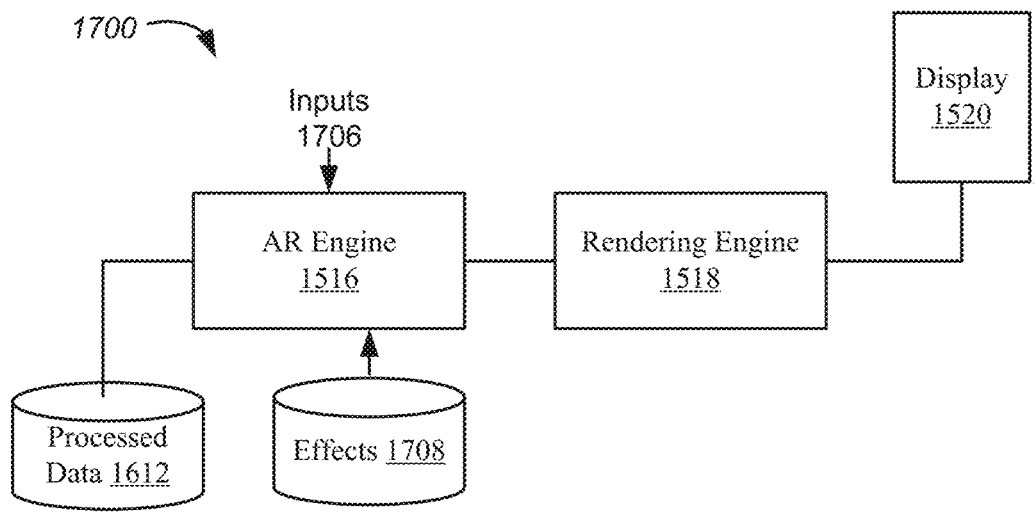

Next, with respect to FIGS. 15, 16 and 17, a system for previewing and initial processing, off-line processing and final viewing of an MVIDMR with body segmentation, background effects and/or body effects are described. FIG. 15 is a block diagram of system 1500 for generating an initial preview of an MVIDMR with background augmentation and body effects anchored to a skeleton. A sensor package 1505 can be provided. In one embodiment, the sensor package 1505 can be included on a mobile device.

The sensor package 1505 can include at least one camera 1504. Optionally, the sensor package 1505 can include a second camera 1502. When two cameras are used, methods such as stereo matching can be used to determine depth data. The sensor package 1505 can also include an IMU (e.g., see FIGS. 7, 8A and 8B).

The skeleton detection 1506 and segmentation 1510 can use data from one or both cameras. Further, as described above with respect to FIG. 10, the segmentation 1510 can utilize information from the skeleton detection. Depending on whether one or two cameras are used, different methods can be used. For example, when only one camera is present different neural nets can be used to detect a skeleton and/or pose and determine the initial body segmentation. When two cameras are present, depth data can contribute the body segmentation. In particular, distance changes can indicate a boundary between the body and the background or between an object and the background in the images.

In one embodiment, depth data can also be used to select regions where skeleton detection is to be performed. The selection of the regions can be performed prior to beginning the skeleton detection or within the skeleton detection algorithm. For example, the depth data can indicate the presence of an object separate from a background, such as a person or a car. Rather than applying the skeleton detection to the entire image, the skeleton detection algorithm can be applied to only the portion of the image not determined to be in the background. This process can reduce the amount of processing operations needed to perform the skeleton detection.

For one or more processes frames, the initial determination of the skeleton position can be stored to skeleton database 1522. Further, the initial determination of the body segmentation including the boundary between the body and the background can be stored to segmentation database 1524. As will be described in more detail in FIG. 16, this information can be used in the off-line processing.

The ground plane determination 1512 can use image data from one or both cameras. Plus, it can utilize the IMU data 1508. The frame selection 1514 can select frames from which to generate an MVIDMR. The frame selection 1514 can choose from among the frames received from one or both cameras 1502 and 1504. Further, the frame selection 1514 can utilize the IMU data 1508. In one embodiment, the IMU data can be used to determine a viewing angle and/or camera orientation associated with an image. In one embodiment, the camera orientation can be used in smoothing algorithms used to improve the viewability of MVIDMRs.

The frame data database 1528 can store image data associated with the selected frames. Further, the frame database can store IMU data associated with the selected frames. In addition, some additional key point tracking can be performed on the frames. Information about the key point locations for each frame can be stored in the frame data database 1528.

Next, information from the skeleton detection 1506, segmentation 1510 and ground plane determination 1512 can be sent to the preview system 1540. The preview system 1540 can replace the background, draw a pedestal or some other effects which highlights an object and incorporate effects into a captured image or images in real-time. Subsequently, the images can be further processed to generate an MVIDMR with the desired effects.

The augmented reality (AR) engine 1516 can determine effects to draw in an image for a preview, such replacing the background, drawing an effect anchored to an object, such as the skeleton of a person and other effects which emphasize an object. The effects can be based upon selections made by a user, such as wings or a particular background. The locations to draw the effects can be based upon the initial skeleton detection 1506, the initial segmentation 1510 and the ground plane determination 1512. An example is provided above with respect to FIG. 13.

The rendering engine 1518 can receive instructions from the AR Engine 1516. The rendering engine 1518 can then render an augmented image in accordance with the instructions. The augmented image can utilize a combination of original image data captured from one or more of the cameras 1502 and 1504 and effects added based upon the instructions of the AR engine 1516. The augmented image can be output to the display 1520. In one embodiment, an augmented image can be generated which shows the original image in a first portion and then an augmented image with the effects from the AR engine 1516.

FIGS. 16 and 17 are block diagrams of systems for further processing and viewing of an MVIDMR with background augmentation and skeleton effects. In FIG. 16, a system 1600 for further processing and MVIDMR generation is provided. The offline processing step also makes the computations necessary to display the AR effects (background replacement and effects attached to person) in the offline viewing.

The initial data 1612 can include data from the skeleton database 1522, the segmentation database 1524, the ground plane determination 1526 and the frame data database 1528, which can also include IMU data. The information can be used to refine and smooth the skeleton detections in 1602 (make them consistent within the multi-view interactive digital media representation) and apply a stabilization process 1604 that makes sure all view-points in the multi-view data are well aligned.

In segmentation 1606, the segmentation can be further computed, refined and smoothed. This refinement of the segmentation can be done on a per frame basis 1608. The smoothing can involve enforcing inter-frame consistency 1610. The inter-frame consistency 1610 can involve propagating the segmentations and merging propagations from multiple view-points. Some of this methodology is described above with respect to FIG. 10. For example, key point tracking can be used to generate a triangular mesh of super-pixels which are used to define transformations between images that are used in the segmentation smoothing process.

Information from the skeleton batch-smoothing 1602, the image stabilization and the segmentation can affect one another. For example, image stabilization 1604 can involve translating, rotating, scaling and cropping images in a sequence of images used to generate an MVIDMR. The stabilization 1604 can center an object in the sequence of images, take out rotations due to the camera orientation changing during image recording and ensure the object is about the same size in every image (Changes in object size can occur as a result of movement of the object closer or farther away from the camera or the camera moving closer or farther away from the object during image recording).

The images, which are generated after stabilization is applied, can be fed into the skeleton batch-smoothing 1602 and/or the segmentation 1606. The skeleton detection 1602 and segmentation 1606 can then be applied to the new images. In addition, as described with respect to FIG. 10, the skeleton detection output can be used as an input for the segmentation 1606. Thus, the output from the skeleton detection 1602 can be received as an input at the segmentation 1606 prior to beginning the segmentation.

Next, in 1700, the data processed in system 1600 of FIG. 16 can be utilized to generate an MVIDMR, such as the MVIDMR 1400 described with respect to FIG. 14. System 1700 can utilize the processed data 1612 as input to the AR engine 1516. The AR engine 1516 can receive inputs 1706 which determine the effects that are rendered. For example, the inputs 1706 can be a selection of a background to render into the image or an affect to anchor to a person. The effects database 1708 can provide data that can be used to render selected effects in accordance with inputs 1706.

The instructions generated by the AR engine 1516 can be passed to the rendering engine 1518. The rendering engine can receive image data and alter then alter it based upon the rendering instructions received from the rendering engine. The augmented image generated by the rendering engine 1518 can be output to a display 1520. A series of images can be output to generate an MVIDMR, such as MVIDMR 1400 described in FIG. 14.

Figure 18:
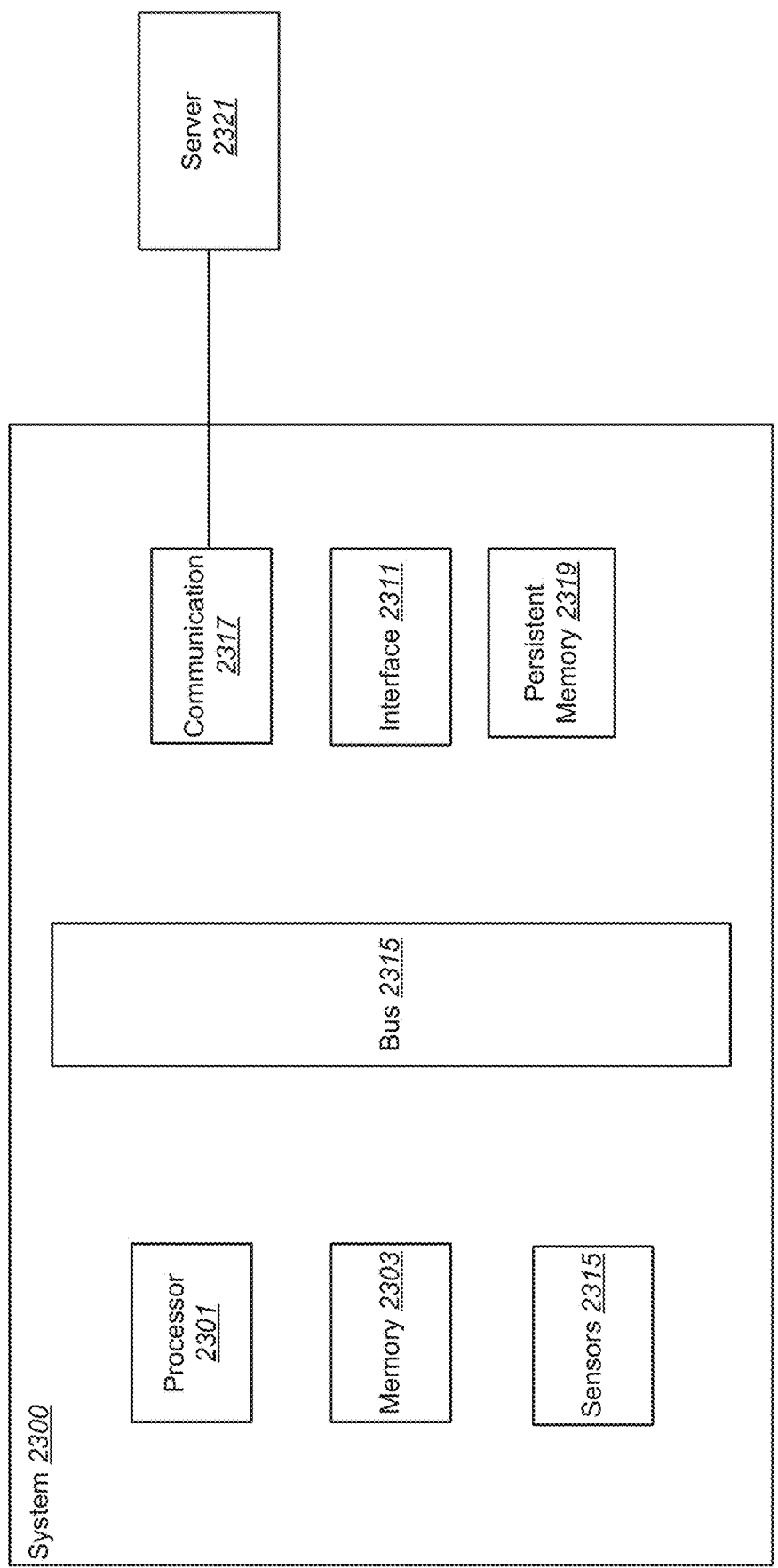
FIG. 18 illustrates a particular example of a computer system that can be used with various embodiments of the present invention.

With reference to FIG. 18, shown is a particular example of a computer system that can be used to implement particular examples of the present invention. For instance, the computer system 2300 can be used to provide multi-view interactive digital media representations according to various embodiments described above. According to particular example embodiments, a system 2300 suitable for implementing particular embodiments of the present invention includes a processor 2301, a memory 2303, an interface 2311, a bus 2315 (e.g., a PCI bus), a persistent memory 2319 and a server 2321.

In particular embodiments, the persistent memory 2319 can store data for subsequent off-line processing as described above with respect to FIG. 16. In some embodiments, the off-line processing can be performed on system 2300. In alternate embodiments, a portion of the off-line processing can be handed off to a remote device, such as server 2321.

The system 2300 can include one or more sensors, such as light sensors, accelerometers, gyroscopes, multi-axis magnetometers, microphones, cameras including stereoscopic capabilities or structured light cameras. Structured light cameras can be used to determine distances from the camera to objects in images. A Kinect™ uses a structured light sensor. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAIVI). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones. When acting under the control of appropriate software or firmware, the processor 2301 is responsible for such tasks such as optimization. Various specially configured devices can also be used in place of a processor 2301 or in addition to processor 2301, such as graphical processor units (GPUs).

In one embodiment, the system 2300 can include dedicated hardware configured to implementing a neural net. For example, a special hardware chip, referred to as an NPU (Neural Processing Unit) can be employed. Neural nets can also be deployed on a GPU. Thus, it may be possible to implement plurality of neural nets in parallel. In one embodiment, the neural nets can be implemented to perform object recognition, segmentation (determining the boundaries or edges associated with objects or object parts) and/or skeleton detection in image data. In one embodiment, the neural nets for the skeleton detection and segmentation can be run in parallel. For example, the GPU can be utilized to execute a neural net which performs skeleton detection and the NPU can be used to execute a neural net which performs segmentation, such as body segmentation or vice versa.

The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 18, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a multi-view interactive digital media representation. In addition, a virtual guide can be provided to help teach a user how to view a multi-view interactive digital media representation in the wearable system. For example, the virtual guide can be provided in synthetic images output to head mounted display which indicate that the multi-view interactive digital media representation can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
processing a request, received via an input interface on the mobile device, to generate a multi-view interactive digital media representation (MVIDMR) of an object including a selection of effects that 1) augment a background surrounding the object, 2) augment the object with a structure or 3) combinations thereof;
recording a live video stream including a plurality of frames from a camera of the mobile device as the mobile device moves along a trajectory wherein an orientation of the camera varies along the trajectory such that the object in the video stream is captured from a plurality of camera views;
during recording of the live video stream:
selecting first frames from among the plurality of frames to utilize in the MVIDMR each of the first frames including the object, and
generating a first skeleton detection and a first segmentation for each of the first frames to determine where to apply the selection of effects in each of the first frames;
after selecting the first frames: performing an image stabilization on the first frames to smooth variations in i) a position of the object, ii) a scale of the object and iii) an orientation of the object that occur between the first frames to generate second frames;
generating, using the second frames, a second skeleton detection and a second segmentation for each of the second frames to determine where to apply the selection of effects in each of the second frames;
augmenting each of the second frames with the selection of effects to generate third frames; and
causing display of, using the third frames, the MVIDMR on a display of the mobile device, the displayed MVIDMR showing the object and the selection of effects such that the object and the selection of effects are displayed from a plurality of different viewing angles.

2. The method of claim 1, wherein the object is a person.

3. The method of claim 2, further comprising, based upon the second skeleton detection, determining one or more locations on a body of the person where to anchor the structure, the structure comprising an article of clothing.

4. The method of claim 3, further comprising, based upon the second skeleton detection, determining a pose of the person.

5. The method of claim 4, wherein the pose of the person is used to generate depth information associated with a body of the person.

6. The method of claim 5, wherein the pose of the person is used to augment the person with the article of clothing in the MVIDMR.

7. The method of claim 6, wherein the MVIDMR is generated in association with an advertisement for the article of clothing.

8. The method of claim 6, wherein the MVIDMR is displayed in association with a selection allowing the person to purchase the article of clothing.

9. The method of claim 3, wherein the background surrounding the person is augmented such that an original background is replaced with a new background.

10. The method of claim 9, wherein the new background includes a plurality of further objects different from the person and wherein the plurality of further objects are viewed from the plurality of different viewing angles in the third frames.

11. The method of claim 1, wherein the object is a vehicle.

12. The method of claim 11, further comprising, based upon the second skeleton detection, determining one or more locations on a body of the vehicle where to anchor the structure.

13. The method of claim 12, wherein the structure is rendered over a damaged portion of the vehicle.

14. The method of claim 13, wherein the structure comprises a tag indicating the damaged portion of the vehicle.

15. The method of claim 13, wherein the structure comprises a view of the damaged portion of the vehicle in an undamaged state.

16. The method of claim 13, wherein the structure comprises an indication of an assessment of severity of damage to the damaged portion of the vehicle.

17. The method of claim 13, wherein the structure comprises an estimate of a cost to repair the damaged portion of the vehicle.

18. The method of claim 11, wherein the background surrounding the vehicle is augmented such that an original background is replaced with a new background.

19. The method of claim 18, wherein the new background includes a plurality of further objects different from the vehicle and wherein the plurality of further objects are viewed from the plurality of different viewing angles in the third frames.

20. The method of claim 19, wherein the structure extends from the object such that a portion of the background appears to be occluded by the structure when the structure is rendered to generate the third frames.

* * * * *